United States Patent [19]
Hoffstein et al.

[11] Patent Number: 6,081,597
[45] Date of Patent: Jun. 27, 2000

[54] PUBLIC KEY CRYPTOSYSTEM METHOD AND APPARATUS

[75] Inventors: Jeffrey Hoffstein; Jill Pipher, both of Pawtucket, R.I.; Joseph H. Silverman, Needham, Mass.

[73] Assignee: NTRU Cryptosystems, Inc., Pawtucket, R.I.

[21] Appl. No.: 08/914,449

[22] Filed: Aug. 19, 1997

Related U.S. Application Data

[60] Provisional application No. 60/024,133, Aug. 19, 1996.
[51] Int. Cl.$^7$ ................................ H04L 9/28; H04L 9/30
[52] U.S. Cl. ................................ 380/28; 380/30; 708/491
[58] Field of Search ................................ 380/28, 30, 21; 708/491

[56] References Cited

U.S. PATENT DOCUMENTS

| | | | |
|---|---|---|---|
| 4,218,582 | 8/1980 | Hellman et al. | 178/22 |
| 4,405,829 | 9/1983 | Rivest et al. | 178/22.1 |
| 4,633,036 | 12/1986 | Hellman et al. | 178/22.11 |
| 4,995,082 | 2/1991 | Schnorr | 380/30 |
| 5,054,066 | 10/1991 | Riek et al. | 380/30 |
| 5,231,668 | 7/1993 | Kravitz | 380/28 |
| 5,276,737 | 1/1994 | Micali | 380/30 |
| 5,299,262 | 3/1994 | Brickell et al. | 380/28 |
| 5,351,297 | 9/1994 | Miyaji et al. | 380/28 |
| 5,375,170 | 12/1994 | Shamir | 380/30 |
| 5,577,124 | 11/1996 | Anshel et al. | 380/46 |
| 5,600,725 | 2/1997 | Rueppel et al. | 380/30 |
| 5,625,692 | 4/1997 | Herzberg et al. | 380/21 |
| 5,790,675 | 8/1998 | Patarin | 380/23 |
| 5,805,703 | 9/1998 | Crandal | 380/30 |

OTHER PUBLICATIONS

R. Pieper, "Cryptanalysis of Rédei– and Dickson Permutations on Arbitrary Finite Rings" in Applicable Algebra in Engineering, Communication and Computing, Springer–Verlag, pp. 59–76, 1993.

Blum, M., Goldwasser, S., "An efficient Probabilistic Public–Key Encryption Scheme Which Hides All Partial Information," Advances in Cryptology: Proceedings of Crypto 84, Lecture Notes in Computer Science, vol. 196, Springer–Verlag, 1985, pp. 289–299. (Month unknown).

Coppersmith, D., Shamir, A., "Lattice Attacks On NTRU," preprint, Apr. 5, 1997, presented at Eurocrypt 97, pp. 1–13.

Goldreich, O., Goldwasser, S., Halevi, S., "Public–Key Cryptosystems From Lattice Reduction Problems," MIT–Laboratory for Computer Science preprint, Nov. 1996, pp. 0–29.

Hoffstein, J., Pipher, J., Silverman, J.H., "NTRU: A Ring–Based Public Key Cryptosystem," preprint, presented at the rump session of Crypto 96, pp. I–1–I–18. (No date).

(List continued on next page.)

*Primary Examiner*—Tod R. Swann
*Assistant Examiner*—Justin T. Darrow
*Attorney, Agent, or Firm*—Martin Novack

[57] ABSTRACT

The public key encryption system of the present invention has short and easily created encryption keys and wherein the encoding and decoding processes are performed extremely rapidly, and has low memory requirements. The encoding and decoding processes use both the addition and multiplication operations in a ring modulo with two different ideals. The cryptosystem of the present invention allows encryption keys to be chosen essentially at random from a large set of binary vectors, for which key lengths are comparable to the key lengths of the most widely used prior art cryptosystems. The present invention features an appropriate security level ($\sim 2^{80}$), with encoding and decoding processes ranging from approximately one to two orders of magnitude faster than the prior art, particularly the exponentiation cryptosystems.

31 Claims, 8 Drawing Sheets

OTHER PUBLICATIONS

Schnorr, C.P., Hoerner, H.H., "Attacking The Chor Rivest Cryptosystem By Improved Lattice Reduction," Proc. Eurocrypt 1995, Lecture Notes in Computer Science, vol. 921, Springer–Verlag, 1995, pp 1–12. (Month unknown).

Stinson, D., "Crytography: Theory and Practice," CRC Press, Boca Raton, 1995, pp. 114–203. (Month unknown).

Goldwasser, S., Micali, S., "Probabilistic Encryption" J. Computer and Systems Science, vol. 28, (1984) pp. 270–299. (Month unknown).

McEliece, R.J., "A Public–Key Cryptosystem Based On Algebraic Coding Theory," JPL Pasadena, DSN Progress Reports, vol. 42–44 (1978) pp. 114–116. (Month unknown).

PUBLIC KEY CRYPTOSYSTEM METHOD AND APPARATUS

RELATED APPLICATION

This application claims priority from U.S. Provisional Patent Application Ser. No. 60/024,133, filed Aug. 19, 1996, and said Provisional Patent Application is incorporated herein by reference.

FIELD OF THE INVENTION

This invention relates to encoding and decoding of information and, more particularly, to a public key cryptosystem for encryption and decryption of digital messages by processor systems.

BACKGROUND OF THE INVENTION

Secure exchange of data between two parties, for example, between two computers, requires encryption. There are two general methods of encryption in use today, private key encryption and public key encryption. In private key encryption, the two parties privately exchange the keys to be used for encoding and decoding. A widely used example of a private key cryptosystem is DES, the Data Encryption Standard. Such systems can be very fast and very secure, but they suffer the disadvantage that the two parties must exchange their keys privately.

A public key cryptosystem is one in which each party can publish their encoding process without compromising the security of the decoding process. The encoding process is popularly called a trap-door function. Public key cryptosystems, although generally slower than private key cryptosystems, are used for transmitting small amounts of data, such as credit card numbers, and also to transmit a private key which is then used for private key encoding.

Heretofore a variety of trap-door functions have been proposed and implemented for public key cryptosystems.

One type of trap-door function which has been used to create public key cryptosystems involves exponentiation in a group; that is, taking an element of a group and repeatedly multiplying the element by itself using the group operation. The group most often chosen is the multiplicative group modulo pq for large prime numbers p and q, although other groups such as elliptic curves, abelian varieties, and even non-commutative matrix groups, have been described. However, this type of trap-door function requires large prime numbers, on the order of 100 digits each, making key creation cumbersome; and the exponentiation process used for encoding and decoding is computationally intensive, requiring many multiplications of hundred digit numbers and on the order of $N^3$ operations to encode or decode a message consisting of N bits.

A second type of trap-door function which has been used to create public key cryptosystems is based on the difficulty of determining which numbers are squares in a group, usually the multiplicative group modulo pq for large primes p and q. Just as in the first type, key creation is cumbersome and encoding and decoding are computationally intensive, requiring on the order of $N^3$ operations to encode or decode a message consisting of N bits.

A third type of trap-door function involves the discrete logarithm problem in a group, generally the multiplicative group or an elliptic curve modulo a large prime p. Again, key creation is cumbersome, since the prime p needs at least 150 digits and p−1 must have a large prime factor; and such systems use exponentiation, so again require on the order of $N^3$ operations to encode or decode a message consisting of N bits.

A fourth type of trap-door function which has been used to create public key cryptosystems is based on the knapsack, or subset sum, problem. These functions use a semigroup, normally the semigroup of positive integers under addition. Many public key cryptosystems of this type have been broken using lattice reduction techniques, so they are no longer considered secure systems.

A fifth type of trap-door function which has been used to create public key cryptosystems is based on error correcting codes, especially Goppa codes. These cryptosystems use linear algebra over a finite field, generally the field with two elements. There are linear algebra attacks on these cryptosystems, so the key for a secure cryptosystem is a large rectangular matrix, on the order of 400,000 bits. This is too large for most applications.

A sixth type of trap-door function which has been used to create public key cryptosystems is based on the difficulty of finding extremely short basis vectors in a lattice of large dimension N. The keys for such a system have length on the order of $N^2$ bits, which is too large for many applications. In addition, these lattice reduction public key cryptosystems are very new, so their security has not yet been fully analyzed.

Most users, therefore, would find it desirable to have a public key cryptosystem which combines relatively short, easily created keys with relatively high speed encoding and decoding processes.

It is among the objects of the invention to provide a public key encryption system for which keys are relatively short and easily created and for which the encoding and decoding processes can be performed rapidly. It is also among the objects hereof to provide a public key encryption system which has relatively low memory requirements and which depends on a variety of parameters that permit substantial flexibility in balancing security level, key length, encoding and decoding speed, memory requirements, and bandwidth.

SUMMARY OF THE INVENTION

The invention allows keys to be chosen essentially at random from a large set of vectors, with key lengths comparable to the key lengths in other common public key cryptosystems, and features an appropriate (e.g. $\approx 2^{80}$ for current circumstances) security level, and provides encoding and decoding processes which are between one and two orders of magnitude faster than the most widely used public key cryptosystem, namely the exponentiation cryptosystem referenced above.

The encoding technique of an embodiment of the public key cryptosystem hereof uses a mixing system based on polynomial algebra and reduction modulo two numbers, p and q, while the decoding technique uses an unmixing system whose validity depends on elementary probability theory. The security of the public key cryptosystem hereof comes from the interaction of the polynomial mixing system with the independence of reduction modulo p and q. Security also relies on the experimentally observed fact that for most lattices, it is very difficult to find the shortest vector if there are a large number of vectors which are only moderately longer than the shortest vector.

An embodiment of the invention is in the form of a method for encoding and decoding a digital message m, comprising the following steps: selecting ideals p and q of a ring R; generating elements f and g of the ring R, and generating element $F_q$ which is an inverse of f (mod q), and generating element $F_p$ which is an inverse of f (mod p); producing a public key that includes h, where h is congruent, mod q, to a product that can be derived using g and $F_q$; producing a private key from which f and $F_p$ can be derived; producing an encoded message e by encoding the message m using the public key and a random element ☐; and producing a decoded message by decoding the encoded message e using the private key.

Further features and advantages of the invention will become more readily apparent from the following detailed description when taken in conjunction with the accompanying drawings.

DETAILED DESCRIPTION

Figure 1:
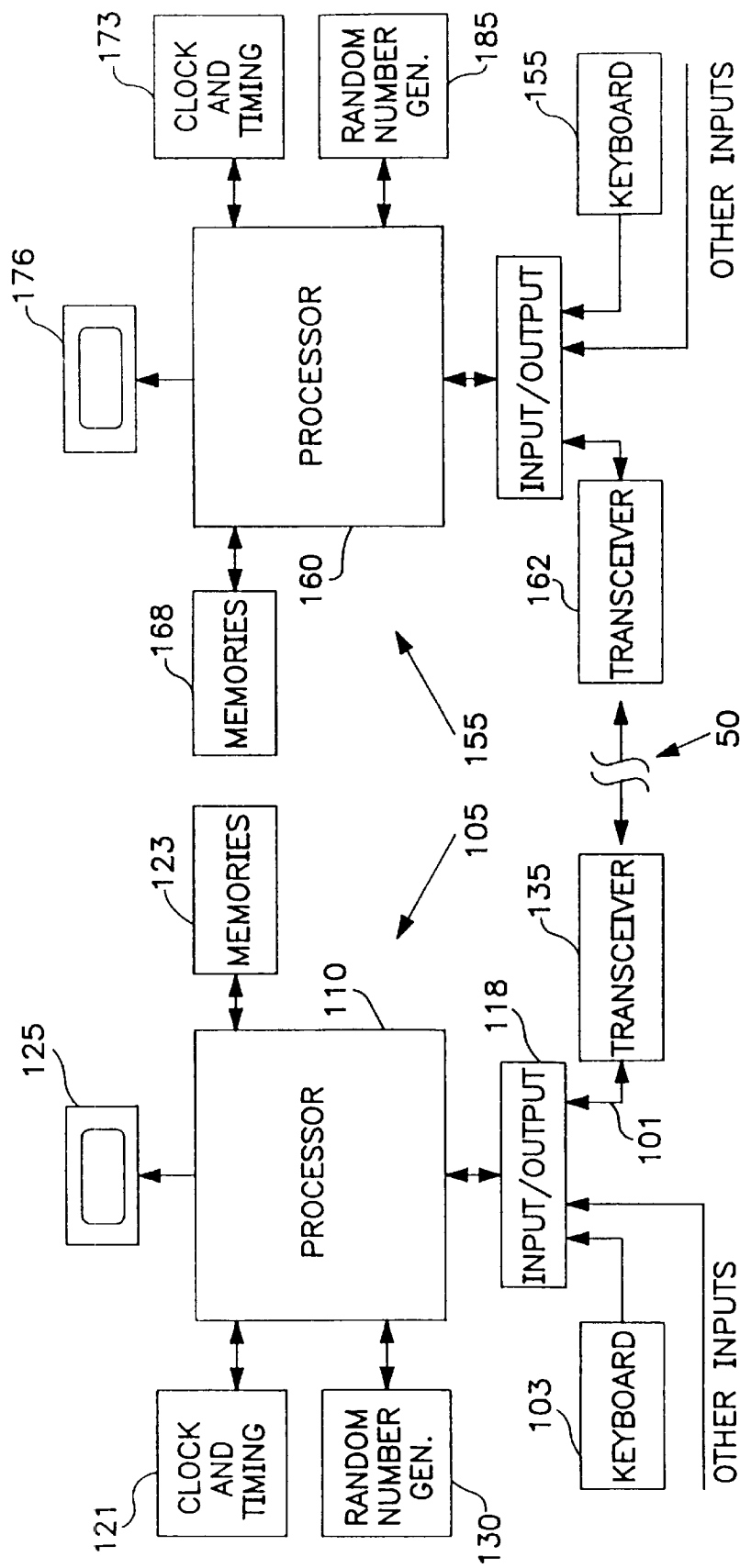
FIG. 1 is a block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The processors may be, for example, Intel Pentium processors. The subsystem 105 will typically include memories 123, clock and timing circuitry 121, input/output functions 118 and monitor 125, which may all be of conventional types. Inputs can include a keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a monitor 176. Inputs include a keyboard 155. Communication of subsystem 155 with the outside world is via transceiver 162 which, again, may comprise a modem or any suitable device for communicating signals.

The encoding technique of an embodiment of the public key cryptosystem hereof uses a mixing system based on polynomial algebra and reduction modulo two numbers, p and q, while the decoding technique uses an unmixing system whose validity depends on elementary probability theory. [It will be understood that the polynomial is a convenient representation of ordered coefficients (a polynomial of degree N−1 having N ordered coefficients, some of which may be zero), and that the processor will perform designated operations on coefficients.] The security of the public key cryptosystem hereof comes from the interaction of the polynomial mixing system with the independence of reduction modulo p and q. Security also relies on the experimentally observed fact that for most lattices, it is very difficult to find the shortest vector if there are a large number of vectors which are only moderately longer than the shortest vector.

The cryptosystem hereof fits into the general framework of a probabilistic cryptosystem as described in M. Blum et al., "An Efficient Probabilistic Public-Key Encryption Scheme Which Hides All Partial Information", Advances in Cryptology: Proceedings of CRYPTO 84, Lecture Notes in Computer Science, Vol. 196, Springer-Verlag, 1985, pp. 289–299; and S. Goldwasser et al., "Probabilistic Encryption", J. Computer and Systems Science 28 (1984), 270–299. This means that encryption includes a random element, so each message has many possible encryptions. Encoding and decoding and key creation are relatively fast and easy using the technique hereof, in which it takes $O(N^2)$ operations to encode or decode a message block of length N, making it considerably faster than the $O(N^3)$ operations required by RSA. Key lengths are O(N), which compares well with the $O(N^2)$ key lengths required by other "fast" public keys systems such as those described in R. J. McEliece, "A Public-Key Cryptosystem Based On Algebraic Coding Theory", JPL Pasadena, DSN Progress Reports 42–44 (1978), 114–116 and O. Goldreich et al. "Public-Key Cryptosystems From Lattice Reduction Problems", MIT—Laboratory for Computer Science preprint, November 1996.

An embodiment of the cryptosystem hereof depends on four integer parameters (N,K,p,q) and three sets $L_q$, $L_\phi$, $L_m$ of polynomials of degree N−1 with integer coefficients. This embodiment works in the ring $R=Z[X]/(X^N-1)$. An element $F \in R$ will be written as a polynomial or a vector, $$F = \sum_{i=1}^{N} F_i x^{N-i} = [F_1, F_2, \ldots, F_N].$$

The star "*" denotes multiplication in R. This star multiplication is given explicitly as a cyclic convolution product, F*G=H with $$H_k = \sum_{i=1}^{k-1} F_i G_{k-i} + \sum_{j=k}^{N} F_i G_{N+k-i} = \sum_{i+j=k (\mathrm{mod}\, N)} F_i G_j.$$

When a multiplication modulo (say) q is performed, the coefficients are reduced modulo q. Further reference can be made to Appendix 1.

The following is an example of an embodiment in accordance with the invention of a public key cryptosystem. Very small numbers are used for ease of illustration, so the example would not be cryptographically secure. In conjunction with the example there is described, as material in double brackets ([ ]) operating parameters that would provide a practical cryptographically secure cryptosystem under current conditions. Further discussion of the operating parameters to achieve a particular level of security is set forth in Appendix 1, which also describes the degree of immunity of an embodiment of the cryptosystem hereof to various types of attack.

The objects used in an embodiment hereof are polynomials of degree N−1, $$a_1x^{N-1} + a_2x^{N-2} + \ldots + a_{N-1}x + a_N,$$

where the coefficients $a_1, \ldots, a_N$ are integers. In the "star" multiplication hereof, $x^N$ is replaced by 1, and $x^{N-1}$ is replaced by x, and $X^{N-2}$ is replaced by $x^2$, and so on. [A polynomial may also be represented by an N-tuple of numbers $$[a_1, a_2, \ldots a_N].$$

In such case the star product is also known as the convolution product. For large values of N, it may be faster to compute convolution products using the method of Fast Fourier Transforms, which take on the order of NlogN steps instead of $N^2$ steps.] For example, taking N=5, and two exemplary polynomials, the star multiplication gives $$(x^4 + 2x^2 - 3x + 2) * (2x^4 + 3x^3 + 5x - 1)$$
$$= 2x^8 + 3x^7 + 4x^6 + 5x^5 - 6x^4 + 16x^3 - 17x^2 + 13x - 2$$
$$= 2x^3 + 3x^2 + 4x + 5x - 6x^4 + 16x^3 - 17x^2 + 13x - 2$$
$$= -6x^4 + 18x^3 - 14x^2 + 17x + 3$$

[A secure system may use, for example N=167 or N=263.] [This embodiment uses the ring of polynomials with integer coefficients modulo the ideal consisting of all multiples of $x^N-1$. More generally, one could use polynomials modulo a different ideal; and even more generally, one could use some other ring R. For further information on rings and ideals, reference can be made, for example, to Topics in Algebra by I. N. Herstein.]

Another aspect of the present embodiment involves reducing the coefficients of a polynomial modulo an integer, such as the ideal q. This essentially means dividing each coefficient by q and replacing the coefficient with its remainder. For example, if q=128 and if some coefficient is 2377, then that coefficient would be replaced with 73, because 2377 divided by 128 equals 18, with a remainder of 73. However, it is easier to use "centered remainders." This means that if the remainder is between 0 and q/2, it is left alone, but if it is between q/2 and q, then q is subtracted from it. Accordingly, using centered reminders for q=128, 2377 would be replaced by −55, since −55=73−128.

To indicate that this remainder process is being performed, a triple equal sign (≡) is used, along with the designation "mod q." The following is an example which combines star multiplication of two polynomials with reduction modulo 5. The answer uses centered remainders.

$$(x^4 + 2x^2 - 3x + 2) * (2x^4 + 3x^3 + 5x - 1)$$

-continued
$$= -6x^4 + 18x^3 - 14x^2 + 17x + 3$$
$$\equiv -x^4 - 2x^3 + x^2 + 2x - 2 \pmod{5}.$$

In creating a public key cryptosystem in accordance with an embodiment hereof (and with the previously indicated small numbers for ease of illustration), a first step is to choose integer parameters N, K, p, and q. Take, for example N=5, K=1, p=3, q=128.

[A secure system may use, for example, N=167, K=6, p=3, $q=2^{16}$= 65536.] Preferably, p and q will be relatively prime; that is, they will have no common factors greater than 1. A discussion of the desirability of having the ideals p and q be relatively prime is set forth in Appendix 1. Some sets of polynomials are chosen, as follows:

$L_g$={polynomials whose coefficients are −2's, −1's, 0's, 1's, and 2's}

$L_\phi$={polynomials with two −1's, two 1's, and one 0 as coefficients}

$L_m$={polynomials whose coefficients are −1's, 0's, and 1's}

[A secure system may use, for example $L_g$={polynomials whose coefficients lie between −177 and 177}

$L_\phi$={polynomials whose coefficients are forty 1's, forty −1's, the rest 0's}

$L_m$={polynomials whose coefficients lie between −3 and 3}

(Note: The polynomials have degree N−1, so for the secure parameters of the example, the polynomials have degree 166. Further, the actual message m being encoded consists of the remainders when the coefficients of m are divided by p, where in this example p=3.)]

The set $L_g$ is used to create the key for the cryptosystem, the set $L_\phi$ is used for encoding messages, and the set $L_m$ is the set of possible messages. For example, $2x^4-x^3+x-2$ is in the set $L_g$, and $x^4-x^3-x^2+1$ is in the set $L_\phi$ To implement the key creation of this example, the key creator, call him Dan, chooses two polynomials f and g from the set $L_g$. In this simplified example K=1, so there is one polynomial g. Suppose that Dan chooses $f=x^4-x^3+2x^2-2x+1$ $g=x^4-x^3+x^2 2x+2.$

[A secure system may use, for example, K+1 polynomials f, $g_1, \ldots, g_k \in L_g$ with K=6.]

A requirement hereof is that f must have an inverse modulo q and an inverse modulo p. What this means is that there must be polynomials $F_q$ and $F_p$ so that $F_q*f \equiv 1 \pmod q$ and $F_p*f \equiv 1 \pmod p$.

The well known Euclidean algorithm can be used to compute $F_q$ and $F_p$. Reference can be made, for example, to Appendix II hereof. (Some f's may not have inverses, in which case Dan would have to go back and choose another f.) For the above example f, we have $F_q=103x^4+29x^3+116x^2+79x+58,$ $$F_p = 2x^4 + 2x.$$

To check that this is the right $F_q$ for f, one can multiply $$F_q * f = (103x^4 + 29x^3 + 116x^2 + 79x + 58) *$$
$$(x^4 - x^3 + 2x^2 - 2x + 1)$$
$$= 256x^4 + 256x - 127$$
$$\equiv 1 \pmod{128}.$$

Similarly, to check that $F_p$ is correct, one can multiply $$F_p * f = (2x^4 + 2x) * (x^4 - x^3 + 2x^2 - 2x + 1)$$
$$= 6x^3 - 6x^2 + 6x - 2$$
$$\equiv 1 \pmod 3.$$

Now, the key creator Dan is ready to create his public key, which is the polynomial h given by $$h \equiv F_q * g \pmod q.$$

[A secure system may use, for example, K polynomials $h_1, \ldots, h_K$ given by $$h_i \equiv F_q * g_i \pmod q \text{ with } i=1,2, \ldots K,$$

with K=6.]
Continuing with the example, Dan would compute $$F_q * g = (103x^4 + 29x^3 + 116x^2 + 79x + 58) *$$
$$(x^4 - x^3 + x^2 - 2x + 2)$$
$$= 243x^4 - 50x^3 + 58x^2 + 232x - 98$$
$$\equiv -13x^4 - 50x^3 + 58x^2 - 24x + 30 \pmod{128}.$$

Then Dan's public key is the polynomial $$h = -13x^4 - 50x^3 + 58x^2 - 24x + 30.$$

Dan's private key is the pair of polynomials (f, $F_p$). In principle, the polynomial f itself can function as the private key, because Fp can always be computed from f; but in practice Dan would probably want to precompute and save $F_p$.

In the next part of the example, encoding with the public key is described. Suppose the encoder, call her Cathy, wants to send Dan a message using his public key h. She chooses a message from the set of possible message $L_m$. For example, suppose that she wants to send the message $$m = x^4 - x^3 + x^2 + 1.$$

To encode this message, she chooses at random a polynomial ø from the set $L_ø$. For example, say she selects $$ø = -x^4 + x^3 - x^2 + 1$$

She uses this randomly chosen polynomial ø, Dan's public key h (as well as p and q, which are part of the public key), and her plaintext message m to create the encoded message e using the formula $$e \equiv pø * h + m \pmod q.$$

[A secure system may use K public keys $h_1, \ldots, h_K$, with K=6 for the secure example. To encode a message, Cathy can randomly choose K polynomials $ø_1, \ldots, ø_K$ from the set $L_ø$ and then create the encoded message e by computing $e = pø_1 * h_1 + pø_2 * h_2 + \ldots + pø_K * h_K + m \pmod q$.] An alternative would be to let h equal $pF_q * g \pmod q$, and then the message can be encoded using the formula $e \equiv ø * h + m \pmod q$. For the present example, Cathy computes $$pø * h + m = 3(-x^4 + x^3 - x^2 + 1) *$$
$$(-13x^4 - 50x^3 + 58x^2 - 24x + 30) +$$
$$(x^4 - x^3 + x^2 + 1)$$
$$= -374x^4 + 50x^3 + 196x^2 - 357x + 487$$
$$\equiv 10x^4 + 50x^3 - 60x^2 + 27x - 25 \pmod{128}.$$

So Cathy's encoded message is the polynomial $$e = 10x^4 + 50x^3 - 60x^2 + 27x - 25,$$

and she sends this encoded message to Dan.

In the next part of the example, decoding using the private key is described. In order to decode the message e, Dan first uses his private key f to compute the polynomial $$a \equiv f * e \pmod q.$$

For the example being used, he computes $$f * e = (x^4 - x^3 + 2x^2 - 2x + 1) * (10x^4 + 50x^3 - 60x^2 + 27x - 25)$$
$$= -262x^4 + 259x^3 - 124x^2 - 13x + 142$$
$$\equiv -6x^4 + 3x^3 + 4x^2 - 13x + 14 \pmod{128},$$

so the polynomial a is $$a = -6x^4 + 3x^3 + 4x^2 - 13x + 14.$$

Next, Dan uses $F_p$, the other half of his private key, to compute $$F_p * a \pmod p,$$

and the result will be the decoded message. Thus for the present example, Dan computes $$F_p * a = (2x^4 + 2x) * (-6x^4 + 3x^3 + 4x^2 - 13x + 14)$$
$$= 34x^4 - 4x^3 - 20x^2 + 36x - 38$$
$$\equiv x^4 - x^3 + x^2 + 1 \pmod 3.$$

Reference can be made to Appendix I for further description of why the decoding works.

In a further embodiment of the invention the ring is a ring of matrices. For example, one can use the ring R=(the ring of M×M matrices with integer coefficients). An element of R looks like $$\begin{pmatrix} a_{11} & a_{12} & \cdots & a_{1M} \\ a_{21} & a_{22} & & a_{2M} \\ \vdots & & \ddots & \vdots \\ a_{M1} & a_{M2} & \cdots & a_{MM} \end{pmatrix}$$

where the coefficients $a_{ij}$ are integers. Addition and multiplication are as usual for matrices, and it will be understood that the processor can treat the matrix members as numbers stored and operated on in any convenient manner. Let $N=M^2$, so a matrix in R has N coefficients. Relatively prime integers p and q are chosen.

In this case, to create a private key, Dan chooses K+2 matrices from R. These matrices can be called $$f, g, w_1, w_2, \ldots, w_K.$$

These matrices should have the property that $f, g, w_1, \ldots w_K$ have fairly small coefficients, and every $w_i$ satisfies $$w_i \equiv 0 \pmod p.$$

(In other words, every coefficient of every $w_i$ is a multiple of p.) To create his key, Dan needs to find inverses for f and g modulo p and q. Thus he finds matrices $F_p, F_q, G_p, G_q$ in R satisfying $fF_p \equiv I \pmod p$
$fF_q \equiv I \pmod q$
$gG_p \equiv I \pmod p$
$gG_q \equiv I \pmod q$ where I is the M×M identity matrix. In general, this is quite easy to do; and if by some chance one of the inverses fail to exist, Dan just chooses a new f or g.

Dan's public key is a list of K matrices $(h_1, h_2, \ldots, h_K)$ determined by the condition $$h_i = F_q w_i G_q \pmod q \text{ for } i=1,2,\ldots,K.$$

(Note that the $w_i$'s are congruent to zero modulo p.) His private key is the four matrices $(f, g, F_p, G_p)$. In principle, f and g alone can be used as the private key, but in practice it is more efficient to precompute and store $F_p$, $G_p$.

The encoding for this matrix example is described next. Suppose that Cathy wants to encode a message m. The message m is a matrix with coefficients modulo p. In order to encode her message, she chooses at random some integers $\phi_1, \ldots, \phi_K$ satisfying some condition; for example, they might be chosen to be non-negative integers whose sum $\phi_1 + \ldots + \phi_K$ equals a predetermined value d. (Note that the $\phi_i$'s are ordinary integers, they are not matrices. Equivalently, they can be thought of as multiples of the identity matrix, so they will commute with every element of the ring R.)

Having chosen her $\phi_i$'s, Cathy creates her encoded message e by the rule $$e \equiv \phi_1 h_1 + \phi_2 h_2 + \ldots + \phi_K h_K + m \pmod q.$$

The decoding for this matrix example is described next. We now assume that Dan has received the encoded message e and wishes to decipher it. He begins by computing the matrix a satisfying $$a \equiv feg \pmod q.$$

As usual, Dan chooses the coefficients of a in some restricted range, such as from $-q/2$ to $q/2$ (i.e., zero-centered coefficients), or from 0 to $q-1$.

If the parameters have been chosen appropriately, then the matrix a will be exactly equal to the sum $$a = \phi_1 w_1 + \phi_2 w_2 + \ldots \phi_K w_K + fmg.$$

(This will always be true modulo q, but a key point is that if q is large enough, then it will be an exact equality, not merely modulo q.) Dan's next step is to reduce a modulo p, say $$b \equiv a \pmod p.$$

Since all of the coefficients of the $w_i$'s are divisible by p, this means that $$b \equiv fmg \pmod p.$$

Finally Dan computes $$F_p b G_p \pmod p$$

to recover the original message m.

The described M×M matrix embodiment has excellent operating time. Encoding requires only additions and takes on the order of $M^2$ operations. Decoding requires two matrix multiplications of M×M matrices, so takes on the order of $M^3$ operations. The message length is on the order of $M^2$, so if N denotes the natural message length (i.e., $N=M^2$), then the matrix embodiment requires O(N) steps to encode and $O(N^{3/2})$ steps to decode. For comparison, the polynomial embodiment requires $O(N^2)$ steps to encode and $O(N^2)$ steps to decode, and the RSA public key system requires $O(N^3)$ steps to encode and $O(N^3)$ steps to decode.

A preliminary analysis suggests that the only natural lattice attacks on the matrix embodiment require using lattices whose dimension is $N^2+N$ (or larger). This would be a significant security improvement over the 2N dimensional lattices used to attack the polynomial embodiment.

In order to avoid brute-force (or potential meet-in-the-middle) attacks, it is necessary that the sample space for the $\phi_i$'s be fairly large, say between $2^{100}$ and $2^{200}$. However, this is not difficult to achieve. For example, if the $\phi_i$'s are chosen non-negative with sum d, then the sample space has $$\binom{d+K-1}{K-1} = \frac{(d+K-1)!}{d!(K-1)!}$$

elements. So if one takes K=15 and d=1024, for example, one gets a sample space with $2^{103.8}$ elements.

The public key size is $KM^2 \log_2(q)$ bits, and the private key size is $2M^2 \log_2(pq)$ bits. Both of these are of a practical size.

Figure 2:
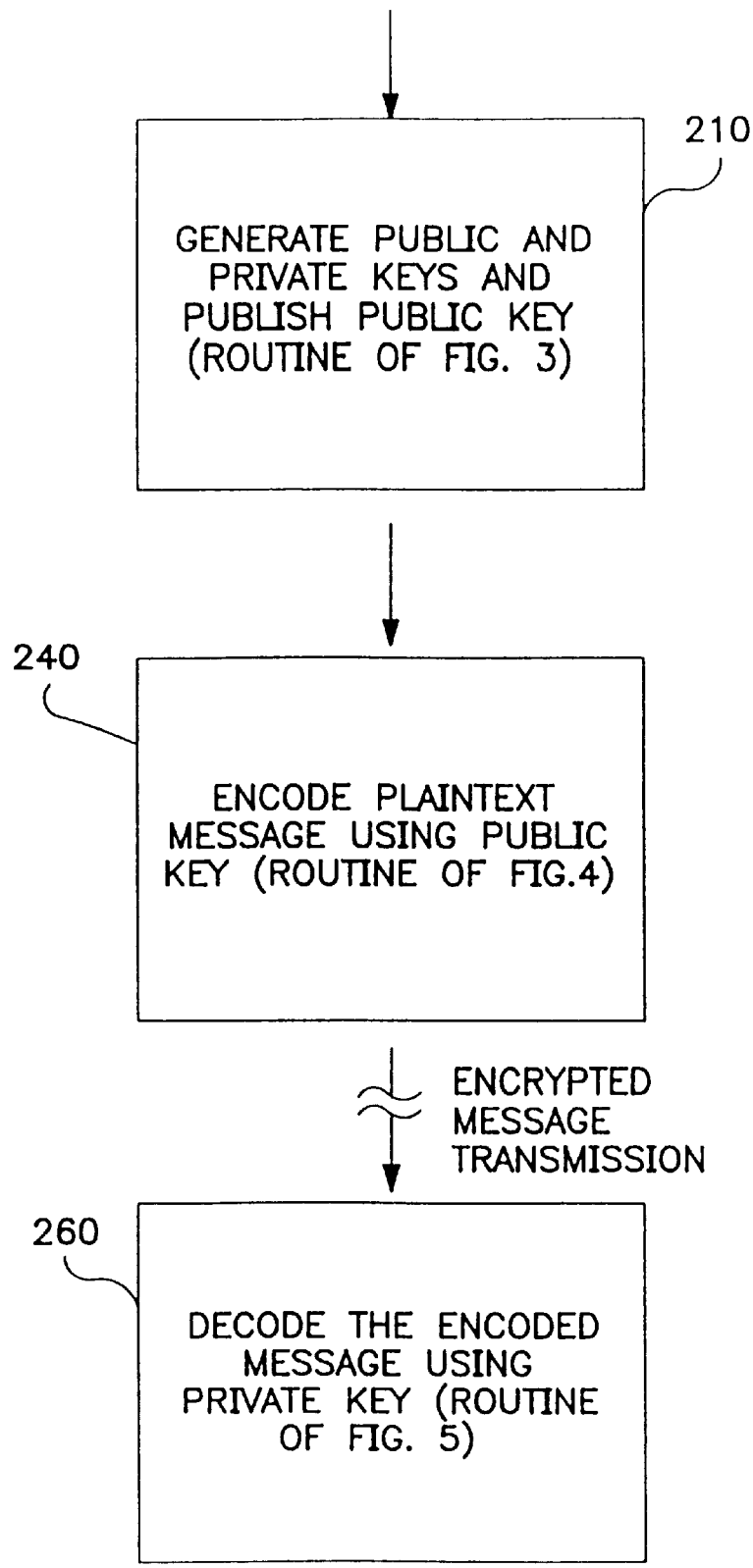
FIG. 2 is a flow diagram of a public key encryption system which, when taken with the subsidiary flow diagrams referred to therein, can be used in implementing embodiments of the invention.

FIG. 2 illustrates a basic procedure that can be utilized with a public key encryption system, and refers to routines illustrated by other referenced flow diagrams which describe features in accordance with an embodiment of the invention. The block 210 represents the generating of the public key and private key information, and the "publishing" of the public key. The routine of an embodiment hereof is described in conjunction with the flow diagram of FIG. 3. In the present example, it can be assumed that this operation is performed at the processor system 105. The public key information can be published; that is, made available to any member of the public or to any desired group from whom the private key holder desires to receive encrypted messages. Typically, although not necessarily, the public key may be made available at a central public key library facility or website where a directory of public key holders and their public keys are maintained. In the present example, it is assumed that the user of the processor system 155 wants to send a confidential message to the user of processor system 105, and that the user of processor system 155 knows the published public key of the user of processor system 150.

The block 220 represents the routine that can be used by the message sender (that is, in this example, the user of processor system 155) to encode the plaintext message using the public key of the intended message recipient. This routine, in accordance with an embodiment of the invention, is described in conjunction with the flow diagram of FIG. 4. The encrypted message is then transmitted over the channel 50 (FIG. 1).

The block 260 of FIG. 2 represents the routine for the decoding of the encrypted message to recover the plaintext message. In the present example, this function is performed by the user of the processor system 105, who employs the private key information. The decoding routine, for an embodiment of the invention, is described in conjunction with the flow diagram of FIG. 5.

Figure 3:
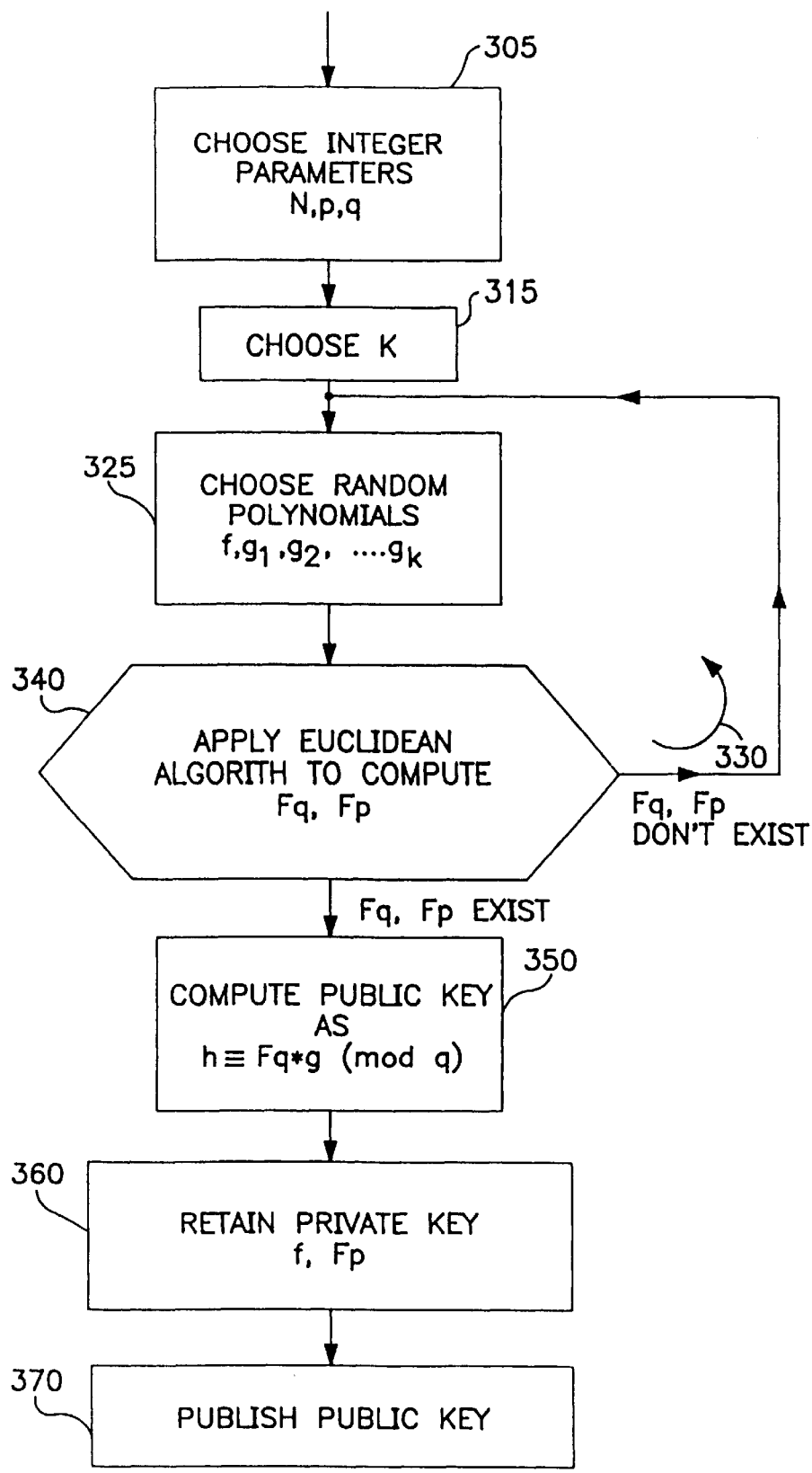
FIG. 3 is a flow diagram of a routine, in accordance with an embodiment of the invention, for generating public and private keys.

Referring now to FIG. 3, there is shown a flow diagram of the routine, as represented generally by the block 210 of FIG. 2, for generating the public and private keys. The routine can be utilized, in the present example, for programming the processor 110 of the processor system 105. The block 305 represents the choosing of integer parameters N, p, and q. As first described above, N determines the degree of the polynomials f and $g_i$ to be generated, and p and q are, respectively, the two ideals used in producing the star products. The block 315 represents the selection of K, which is the number of polynomials $g_i$ to be used. In the simplified example above, K was 1, and it was noted that a particular exemplary relatively secure system could use K=6. Next, the block 325 represents the choosing of random polynomials f, $g_1, G_2 \ldots g_K$. The coefficients may, for example, be chosen using a random number generator, which can be implemented, in known fashion, using available hardware or software. In the present embodiment, each of the processor systems is provided with a random number generator, designated by the blocks 130 and 185 respectively, in FIG. 1.

The block 340 represents application of the Euclidean algorithm to determine the inverses, $F_q$ and $F_p$, in the manner described above, for the previously selected polynomial f, if such inverses exist. If $F_p$, $F_q$ do not exist, the block 325 is re-entered, and a new polynomial f is chosen. The loop 330 is continued until polynomials are chosen for which the defined inverses can be computed. [The probability of the inverses existing for a given polynomial is relatively high, so a relatively small number of traversals through the loop 330 will generally be expected before the condition is met.] The block 350 is then entered, this block representing the computation of the public key, h in accordance with $$h = F_q * g \pmod{q}$$

as first described above. [For K>1, there will be public key components $h_i$ for i=1,2, . . . ,K.] As represented by the block 360, the private key is retained as the polynomials f, $F_p$, and the public key can then be published, as represented by the block 370.

Figure 4:
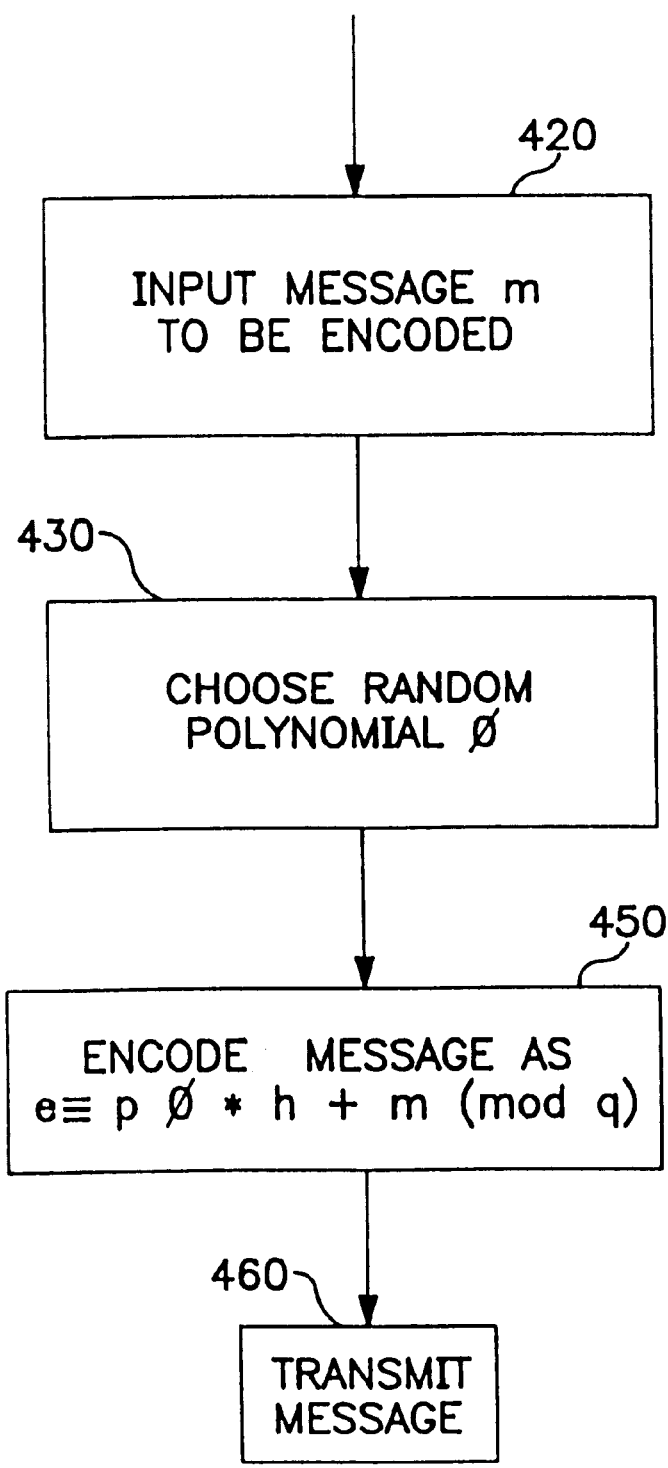
FIG. 4 is a flow diagram in accordance with an embodiment of the invention, for encoding a message using a public key.

FIG. 4 is a flow diagram, represented generally by the block 240 of FIG. 2, of a routine for programming a processor, such as the processor 160 of the processor system 155 (FIG. 1) to implement encoding of a plaintext message m. The message to be encoded is input (block 420) and a random polynomial ø is chosen (block 430). [If K>1, then K random polynomials $ø_1, ø_2, \ldots, ø_K$ are chosen.] The polynomial can be from the set $L_ø$, as described above, and the random coefficients can be selected by any hardware or software means, for example the random number generator 185. The encoded message, e, can then be computed (block 450) as $$e = pø * h + m \pmod{q}.$$

As first noted above, for K greater than 1, the encoded message would be $e \equiv pø_1 * h_1 + pø_2 * h_2 + \ldots + pø_K * h_K + m$ (mod q). The encoded message can be transmitted (block 460) over channel 50 to the keyholder who, in the present example, is the user of the processor system 105.

Figure 5:
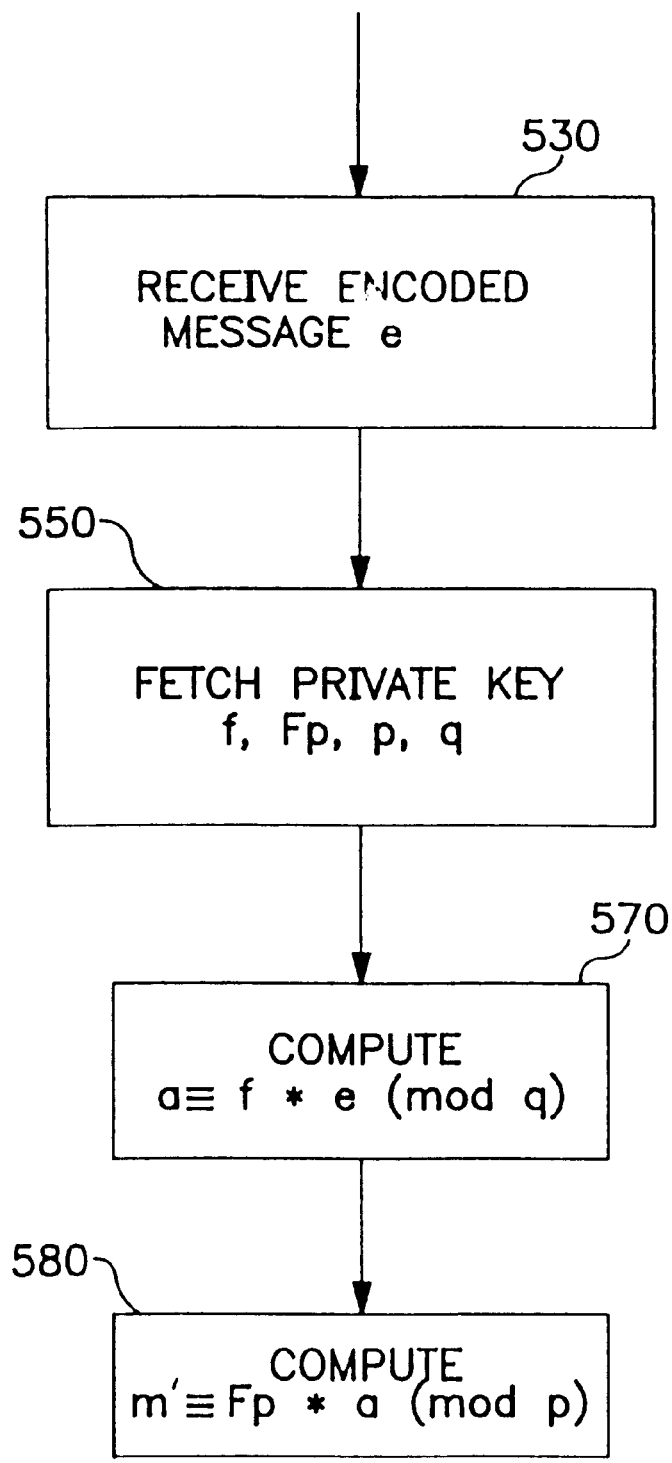
FIG. 5 is a flow diagram in accordance with an embodiment of the invention, for decoding an encoded message using a private key.

FIG. 5 is a flow diagram represented generally in FIG. 2 by the block 260, of a routine in accordance with an embodiment of the invention for decoding the encrypted message. The block 530 represents the receiving of the encrypted message, e. The retained private key information, which includes the previously defined polynomials f and f and the integers N, p, and q, are fetched (block 550). Next, the block 570 represents the computation of $$a = f * e \pmod{q}.$$

The decoded message, designated here as m', can then be computed (block 580) as $$m' = F_p * a \pmod{p}.$$

Figure 6:
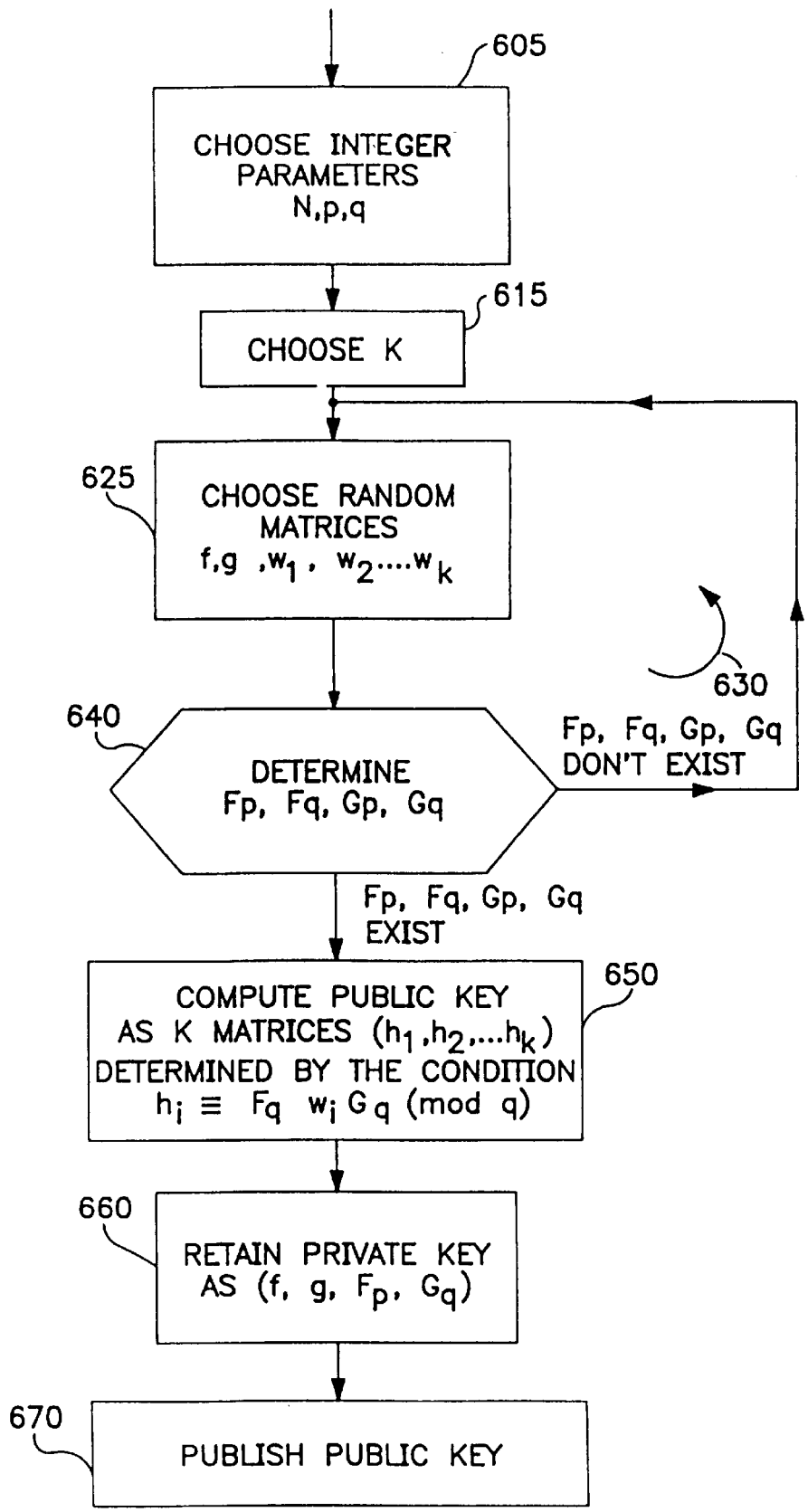
FIG. 6 is a flow diagram of a routine, in accordance with another embodiment of the invention, for generating public and private keys.
Figure 7:
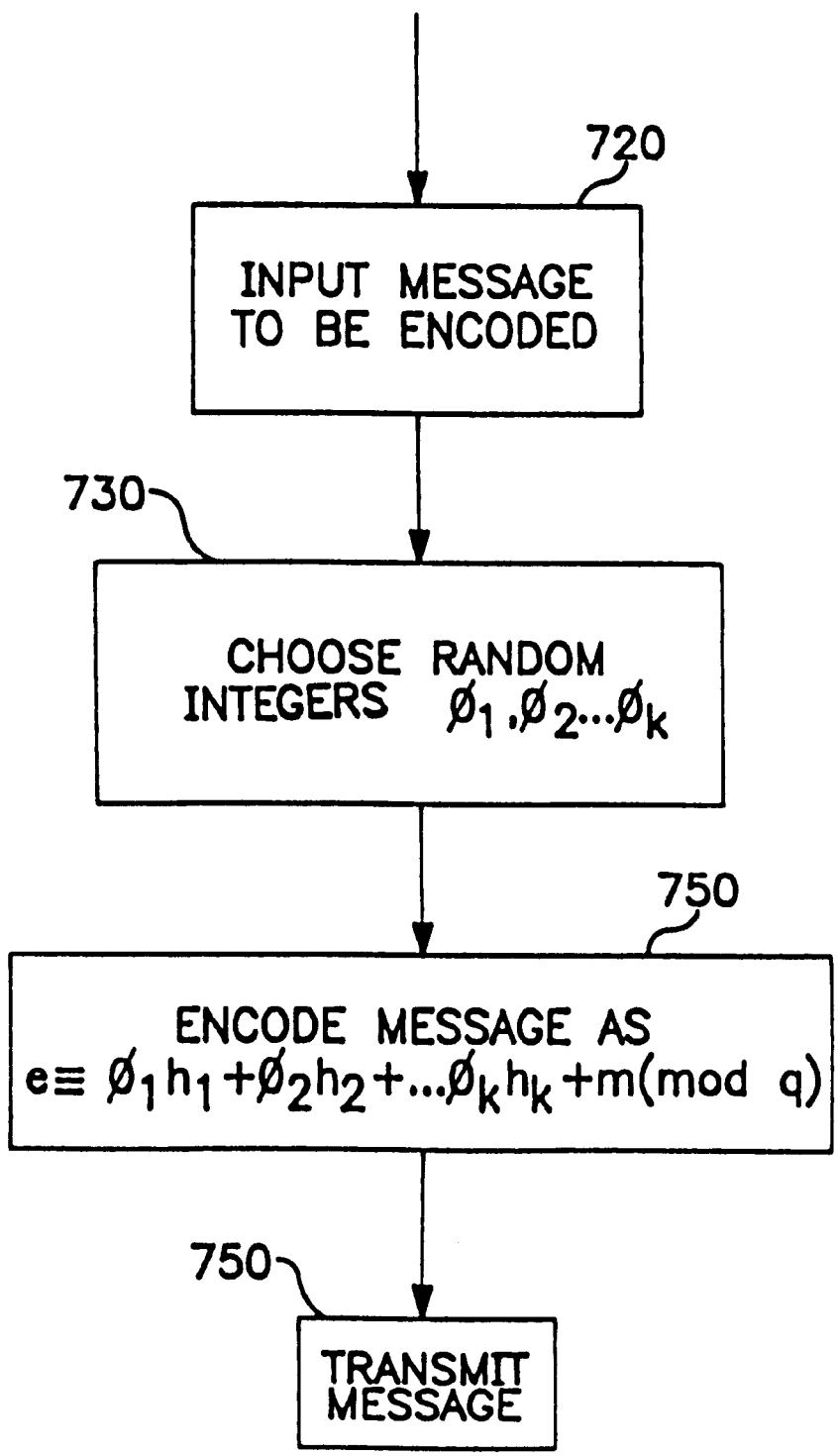
FIG. 7 is a flow diagram in accordance with another embodiment of the invention, for encoding a message using a public key.
Figure 8:
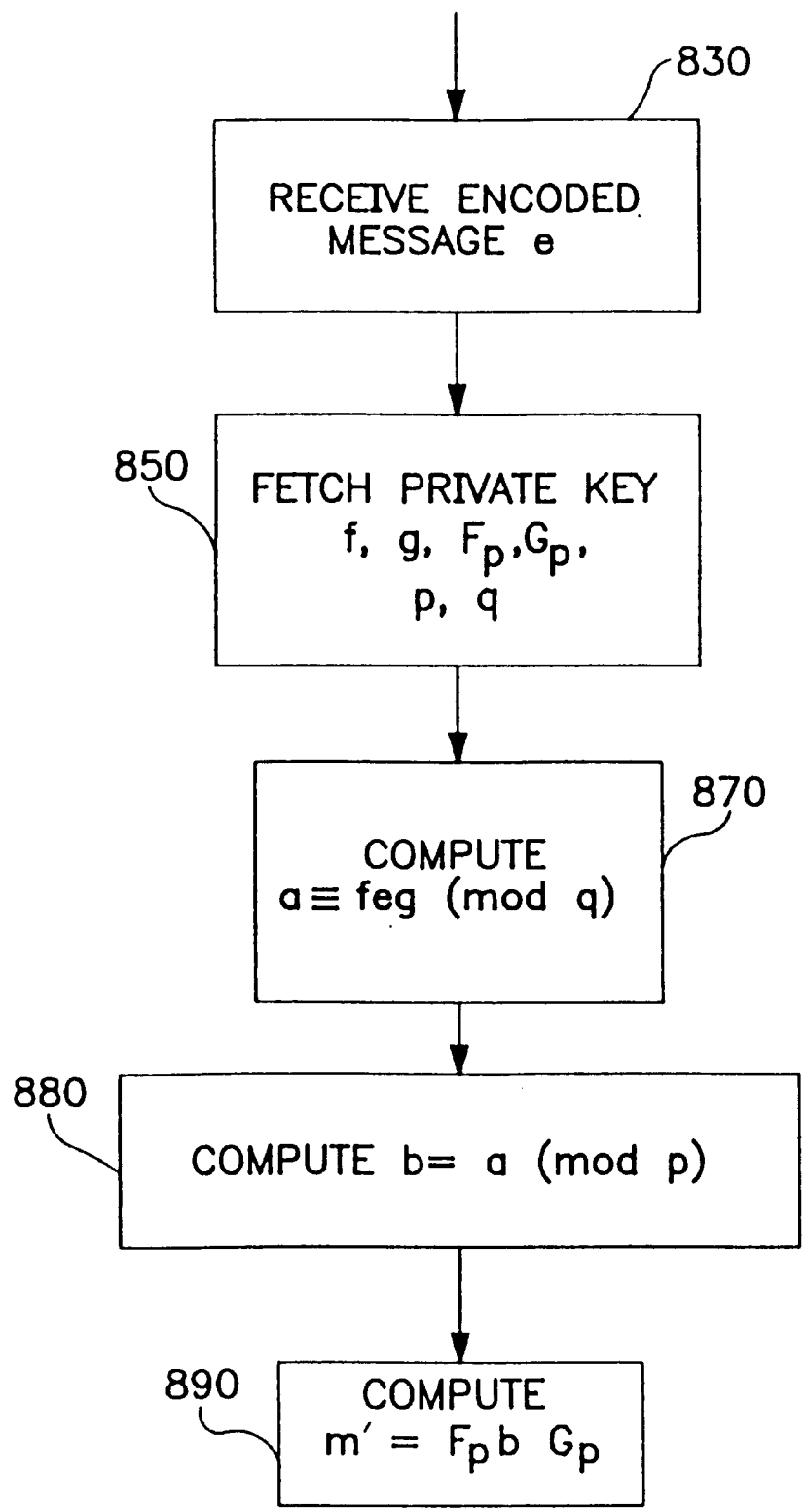
FIG. 8 is a flow diagram in accordance with another embodiment of the invention, for decoding an encoded message using a private key.

FIGS. 6, 7 and 8 are flow diagrams relating to the above-described matrix embodiment. FIG. 6 is a flow diagram of the routine, as represented generally by the block 210 of FIG. 2, for generating the public and private keys. As above, the routine can be utilized, in the present example, for programming the processor 110 of the processor system 105. The block 605 represents the choosing of integer parameters N, p, and q, where N is the number of matrix coefficients, and p and q are relatively prime integers. The block 615 represents the selection of K, which determines the number of matrices. Next, the block 625 represents the choosing of random matrices $f, g, w_1, w_2, \ldots, w_k$ with the requirement that $w_i, w_2, \ldots, w_K$ are all congruent to 0 modulo p. Again, the random number generator 130 (FIG. 1) can be used for this purpose.

The block 640 represents determination of the previously defined matrices $F_p$, $F_q$, $G_p$ and $G_q$. If these matrices do not exist, the block 625 is re-entered, and new matrices f and g are chosen. The loop 630 is continued until matrices are chosen for which the defined inverses can be computed. The block 650 is then entered, this block representing the computation of the public key, a list of K matrices $(h_1, h_2, \ldots, h_K)$ determined by the condition $$h_i \equiv F_q w_i G_q \pmod{q} \text{ for } i = 1, 2, \ldots, K.$$

As represented by the block 660, the private key is retained as the matrices (f, g, $F_p$, $G_p$) and the public key can then be published, as represented by the block 670.

FIG. 7 is a flow diagram, represented generally by the block 240 of FIG. 2, of a routine for programming a processor, such as the processor 160 of the processor system 155 (FIG. 1) to implement encoding of a plaintext message m using the technique of the present matrix embodiment. The message to be encoded is input (block 720) and the random integers $ø_1, ø_2, \ldots ø_k$ are chosen (block 730). The integers can be selected by the random number generator 185 (FIG. 1). The encoded message, e, can then be computed (block 750) as $$e \equiv ø_1 h_1 + ø_2 h_2 + \ldots + ø_K h_K + m \pmod{q}.$$

The encoded message can be transmitted (block 760) over channel 50, to the keyholder which, in the present example, is the user of the processor system 105.

FIG. 8 is a flow diagram represented generally in FIG. 2 by the block 260, of a routine for decoding the encrypted message in accordance with the present matrix embodiment. The block 830 represents the receiving of the encrypted message, e. The retained private key information, which includes the previously defined F, g, $F_p$ and $G_p$, and the integers N, p, and q, are fetched (block 850). Then, the block 870 represents the computation of $$a \equiv feg \pmod{q}.$$

Next, a is reduced modulo p to b (block 880) as $$b \equiv a \pmod{p}.$$

The decoded message is then computed (block 890) as $$m' = F_p b G_p \pmod{p}.$$

The invention has been described with reference to particular preferred embodiments, but variations within the spirit and scope of the invention will occur to those skilled in the art. For example, it will be understood that the public or private keys can be stored on any suitable media, for example a "smart card", which can be provided with a microprocessor capable of performing encoding and/or decoding, so that encrypted messages can be communicated to and/or from the smart card.

I-1

APPENDIX I

NTRU: A RING-BASED PUBLIC KEY CRYPTOSYSTEM

JEFFREY HOFFSTEIN, JILL PIPHER, JOSEPH H. SILVERMAN

ABSTRACT. We describe NTRU, a new public key cryptosystem. NTRU features reasonably short, easily created keys, high speed, and low memory requirements. NTRU encoding and decoding uses a mixing system suggested by polynomial algebra combined with a clustering principle based on elementary probability theory. The security of the NTRU cryptosystem comes from the interaction of the polynomial mixing system with the independence of reduction modulo two relatively prime integers $p$ and $q$.

CONTENTS

0. Introduction
1. Description of the NTRU Algorithm
2. Parameter Selection
3. Security Analysis
4. Implementation Considerations
5. Moderate Security Parameters For NTRU
6. Comparison With Other PKCS's
Appendix A. An Elementary Lemma

§0. INTRODUCTION

There has been considerable interest in the creation of efficient and computationally inexpensive public key cryptosystems since Diffie and Hellman [4] explained how such systems could be created using one-way functions. Currently, the most widely used public key system is RSA, which was created by Rivest, Shamir and Adelman in 1978 [10] and is based on the difficulty of factoring large numbers. Other systems include the McEliece system [9] which relies on error correcting codes, and a recent system of Goldreich, Goldwasser, and Halevi [5] which is based on the difficulty of lattice reduction problems.

In this paper we describe a new public key cryptosystem, which we call the NTRU system. The encoding procedure uses a mixing system based on polynomial algebra and reduction modulo two numbers $p$ and $q$, while the decoding procedure uses an unmixing system whose validity depends on elementary probability theory.

I-2

JEFFREY HOFFSTEIN, JILL PIPHER, JOSEPH H. SILVERMAN

The security of the NTRU public key cryptosystem comes from the interaction of the polynomial mixing system with the independence of reduction modulo $p$ and $q$. Security also relies on the (experimentally observed) fact that for most lattices, it is very difficult to find extremely short (as opposed to moderately short) vectors.

We mention that the presentation in this paper differs from an earlier, widely circulated but unpublished, preprint [7] in two major ways. First, we have introduced a new parameter $K$ which can be used to produce systems with better operating characteristics. Second, the analysis of lattice-based attacks has been expanded and clarified, based largely on the numerous comments received from Don Coppersmith, Johan Håstad, and Adi Shamir in person, via email, and in the recent article [3]. We would like to take this opportunity to thank them for their interest and their help.

NTRU fits into the general framework of a probabilistic cryptosystem as described in [1] and [6]. This means that encryption includes a random element, so each message has many possible encryptions. Encoding and decoding with NTRU are extremely fast, and key creation is fast and easy. See Sections 4 and 5 for specifics, but we note here that NTRU takes $O(N^2)$ operations to encode or decode a message block of length $N$, making it considerably faster than the $O(N^3)$ operations required by RSA. Further, NTRU key lengths are $O(N)$, which compares well with the $O(N^2)$ key lengths required by other "fast" public keys systems such as [9, 5].

§1. DESCRIPTION OF THE NTRU ALGORITHM

§1.1. Notation. An NTRU cryptosystem depends on four integer parameters $(N, K, p, q)$ and three sets $\mathcal{L}_g$, $\mathcal{L}_\phi$, $\mathcal{L}_m$ of polynomials of degree $N-1$ with integer coefficients. We work in the ring $R = \mathbb{Z}[X]/(X^N - 1)$. An element $F \in R$ will be written as a polynomial or a vector, $$F = \sum_{i=1}^{N} F_i x^{N-i} = [F_1, F_2, \ldots, F_N].$$

We write $\circledast$ to denote multiplication in $R$. This *star multiplication* is given explicitly as a cyclic convolution product, $$F \circledast G = H \quad \text{with} \quad H_k = \sum_{i=1}^{k-1} F_i G_{k-i} + \sum_{j=k}^{N} F_i G_{N+k-i} = \sum_{i+j \equiv k \pmod{N}} F_i G_j.$$

When we do a multiplication modulo (say) $q$, we mean to reduce the coefficients modulo $q$.

*Remark.* In principle, computation of a product $F \circledast G$ requires $N^2$ multiplications. However, for a typical product used by NTRU, one of $F$ or $G$ has small coefficients, so the computation of $F \circledast G$ is very fast. On the other hand, if $N$ is taken to be large, then it might be faster to use Fast Fourier Transforms to compute products $F \circledast G$ in $O(N \log N)$ operations.

I-3

NTRU: A RING-BASED PUBLIC KEY CRYPTOSYSTEM

§1.2 Key Creation. To create an NTRU key, Dan randomly chooses $K+1$ polynomials $f, g_1, \ldots, g_K \in \mathcal{L}_g$. The polynomial $f$ must satisfy the additional requirement that it have inverses modulo $q$ and modulo $p$. For suitable parameter choices, this will be true for most choices of $f$, and the actual computation of these inverses is easy using a modification of the Euclidean algorithm. We will denote these inverses by $F_q$ and $F_p$, that is, $$F_q \circledast f \equiv 1 \pmod{q} \quad \text{and} \quad F_p \circledast f \equiv 1 \pmod{p}. \tag{1}$$

Dan next computes the quantities $$h_i \equiv F_q \circledast g_i \pmod{q}, \quad 1 \leq i \leq K. \tag{2}$$

Dan's public key is the list of polynomials $$(h_1, h_2, \ldots, h_K).$$

Dan's private key is the single polynomial $f$, although in practice he will also want to store $F_p$.

§1.3 Encoding. Suppose that Cathy (the encoder) wants to send a message to Dan (the decoder). She begins by selecting a message $m$ from the set of plaintexts $\mathcal{L}_m$. Next she randomly chooses $K$ polynomials $\phi_1, \ldots, \phi_K \in \mathcal{L}_\phi$ and uses Dan's public key $(h_1, \ldots, h_K)$ to compute $$e \equiv \sum_{i=1}^{K} p\phi_i \circledast h_i + m \pmod{q}.$$

This is the encoded message which Cathy transmits to Dan.

§1.4 Decoding. Suppose that Dan has received the message $e$ from Cathy and wants to decode it using his private key $f$. To do this efficiently, Dan should have precomputed the polynomial $F_p$ described in Section 1.1.

In order to decode $e$, Dan first computes $$a \equiv f \circledast e \pmod{q},$$

where he chooses the coefficients of $a$ in the interval from $-q/2$ to $q/2$. Now treating $a$ as a polynomial with integer coefficients, Dan recovers the message by computing $$F_p \circledast a \pmod{p}.$$

*Remark.* For appropriate parameter values, there is an extremely high probability that the decoding procedure will recover the original message. However, some parameter choices may cause occasional decoding failure, so one should probably include a few check bits in each message block. The usual cause of decoding failure will be that the message is improperly centered. In this case Dan will be able to recover the message by choosing the coefficients of $a \equiv f \circledast e \pmod{q}$ in a slightly different interval, for example from $-q/2 + x$ to $q/2 + x$ for some small (positive or negative) value of $x$. If no value of $x$ works, then we say that we have *gap failure* and the message cannot be decoded as easily. For well-chosen parameter values, this will occur so rarely that it can be ignored in practice.

I-4

JEFFREY HOFFSTEIN, JILL PIPHER, JOSEPH H. SILVERMAN

§1.5 Why Decoding Works. The polynomial $a$ that Dan computes satisfies $$a \equiv f \circledast e \equiv \sum_{i=1}^{K} f \circledast p\phi_i \circledast h_i + f \circledast m \pmod{q}$$

$$\equiv \sum_{i=1}^{K} f \circledast p\phi_i \circledast F_q \circledast g_i + f \circledast m \pmod{q} \quad \text{from (2)},$$

$$\equiv \sum_{i=1}^{K} p\phi_i \circledast g_i + f \circledast m \pmod{q} \quad \text{from (1)}.$$

Consider this last polynomial $$\sum_{i=1}^{K} p\phi_i \circledast g_i + f \circledast m.$$

For appropriate parameter choices, we can ensure that (almost always) all of its coefficients lie between $-q/2$ and $q/2$, so that it doesn't change if its coefficients are reduced modulo $q$. This means that when Dan reduces the coefficients of $f \circledast e$ modulo $q$ into the interval from $-q/2$ to $q/2$, he recovers *exactly* the polynomial $$a = \sum_{i=1}^{K} p\phi_i \circledast g_i + f \circledast m \quad \text{in} \quad \mathbb{Z}[X]/(X^N - 1).$$

Reducing $a$ modulo $p$ then gives him the polynomial $f \circledast m \pmod{p}$, and multiplication by $F_p$ retrieves the message $m \pmod{p}$.

§2 PARAMETER SELECTION

§2.1 Notation and a norm estimate. We define the *width* of an element $F \in R$ to be $$|F|_\infty = \max_{1 \le i \le N}\{F_i\} - \min_{1 \le i \le N}\{F_i\}.$$

As our notation suggests, this is a sort of $L^\infty$ norm on $R$. Similarly, we define a *centered $L^2$ norm* on $R$ by $$|F|_2 = \left(\sum_{i=1}^{N}(F_i - \bar{F})^2\right)^{1/2}, \quad \text{where} \quad \bar{F} = \frac{1}{N}\sum_{i=1}^{N} F_i.$$

(Equivalently, $|F|_2/\sqrt{N}$ is the standard deviation of the coefficients of $F$.)

Proposition. *For any $\varepsilon > 0$ there are constants $c_1, c_2 > 0$, depending on $\varepsilon$, $N$ and $K$, such that for randomly chosen polynomials $F_1, \ldots, F_K, G_1, \ldots, G_K \in R$, the probability is greater than $1 - \varepsilon$ that they satisfy*

$$c_1 \sum_{i=1}^{K} |F_i|_2 \cdot |G_i|_2 \le \left|\sum_{i=1}^{K} F_i \circledast G_i\right|_\infty \le c_2 \sum_{i=1}^{K} |F_i|_2 \cdot |G_i|_2. \qquad (3)$$

Of course, this proposition would be useless from a practical veiwpoint if the ratio $c_2/c_1$ were very large for small $\varepsilon$'s. However, it turns out that even for moderately large values of $N$ and $K$ and very small values of $\varepsilon$, the constants $c_1, c_2$ are not at all extreme. We have verified this experimentally in a large number of situations and have an outline of a theoretical proof.

I-5

NTRU: A RING-BASED PUBLIC KEY CRYPTOSYSTEM

§2.2 Sample spaces. As examples of typical sample spaces, we will take $\mathcal{L}_g = \{g \in R : g \text{ has coefficients between } -(r-1)/2 \text{ and } (r-1)/2 \text{ inclusive}\}$ $\mathcal{L}_\phi = \{\phi \in R : \phi \text{ has } d \text{ coefficients equal } 1, d \text{ coefficients equal } -1, \text{ the rest } 0\}$ $\mathcal{L}_m = \{m \in R : m \text{ has coefficients between } -(s-1)/2 \text{ and } (s-1)/2 \text{ inclusive}\}$ Later we will see that there are various constraints which $r, d, s$ must satisfy in order to achieve security. We also note that every $\phi \in \mathcal{L}_\phi$ has $L^2$ norm $|\phi|_2 = \sqrt{2d}$, while average elements $g \in \mathcal{L}_g$ and $m \in \mathcal{L}_m$ have $L^2$ norms $|g|_2 = \sqrt{N(r^2-1)/12}$ and $|m|_2 = \sqrt{N(s^2-1)/12}$ respectively. To ease notation, we will write $L_g, L_\phi, L_m$ for the average $L^2$ norm of elements of $\mathcal{L}_g, \mathcal{L}_\phi, \mathcal{L}_m$ respectively.

Although it is not strictly necessary, we will make the additional assumption that $L_m \approx pL_\phi$ This assumption will make it easier to analyze possible lattice attacks, as well as making such attacks less effective. As an example, suppose we take $d \approx N/4$. Then we would take $s \approx \sqrt{6}p$. So the natural mod $p$ information contained in $m$ would have to be "thickened" by randomly adding and subtracting $p$ to coefficients of $m$.

§2.3 A decoding criterion. As described in §1.5, Dan will be able to decode the encoded message $m$ provided that $|\sum p\phi_i \circledast g_i + f \circledast m|_\infty < q$. We can use the inequality (3) of the above Proposition (with $K+1$ in place of $K$ and for a suitably small choice of $\varepsilon$) to estimate $$\left|\sum_{i=1}^{K} p\phi_i \circledast g_i + f \circledast m\right|_\infty \leq c_2 \sum_{i=1}^{K} p|\phi_i|_2 \cdot |g_i|_2 + |f|_2 \cdot |m|_2$$

$$\approx c_2 L_g(KpL_\phi + L_m)$$

$$\approx c_2 pL_g L_\phi(K+1) \quad \text{using the assumption } L_m \approx pL_\phi$$

So in order to decode (with probability $1 - \varepsilon$), Dan needs to choose parameters satisfying the *decoding constraint*

$$c_2 pL_g L_\phi(K+1) < q. \tag{4}$$

§3 SECURITY ANALYSIS

§3.1 Meet-in-the-middle attacks. For simplicity (and to aid the attacker), we assume $K = 1$, so an encoded message looks like $e \equiv \phi \circledast h + m \pmod{q}$. Andrew Odlyzko has pointed out that there is a meet-in-the-middle attack which can be used against $\phi$, and we observe that a similar attack applies also to the private key $f$. Briefly, one splits $f$ in half, say $f = f_1 + f_2$, and then one matches $f_1 \circledast e$ against $-f_2 \circledast e$, looking for $(f_1, f_2)$ so that the corresponding coefficients have approximately the same value. Hence in order to obtain a security level of (say) $2^{80}$, one must choose $f$, $g$, and $\phi$ from sets containing around $2^{160}$ elements.

§3.2 Multiple transmission attacks. Again for simplicity we assume that $K = 1$. We observe that if Cathy sends a single message $m$ several times using the same public key but different random $\phi$'s, then the attacker Betty will be able to recover a large part of the message. Briefly, suppose that Cathy transmits $e_i \equiv \phi_i \circledast h + m \pmod{q}$ for $i = 1, 2, \ldots, r$. Betty can then compute $(e_i - e_1) \circledast h^{-1} \pmod{q}$, thereby recovering $\phi_i - \phi_1 \pmod{q}$. However, the coefficients of the $\phi$'s are so small that she recovers exactly $\phi_i - \phi_1$, and from this she will recover exactly many of the coefficients of $\phi_1$. If $r$ is even of moderate size (say 4 or 5), Betty will recover enough of $\phi_1$ to be able to test all possibilities by brute force, thereby recovering $m$. Thus multiple transmission are not advised without some further scrambling of the underlying message. We do point out that even if Betty decodes a single message in this fashion, this information will not assist her in decoding any further messages.

§3.3 Lattice based attacks.

We begin with a few words concerning lattice reduction. The goal of lattice reduction is to find one or more "small" vectors in a given lattice $\mathcal{M}$. In theory, the smallest vector in $\mathcal{M}$ can be found by an exhaustive search, but in practice this is not possible if the dimension of $\mathcal{M}$ is large. The LLL algorithm of Lenstra-Lenstra-Lovász [8], with various improvements due to Schnorr [11, 12] and others, will find small vectors of $\mathcal{M}$ in polynomial time, but for most lattices of large ($\geq 100$, say) dimension, it will not find the smallest vector, and the gap between the smallest LLL-determinable vector and the actual smallest vector appears to increase exponentially with the dimension. In order to describe the security of NTRU from lattice attacks, we consider the following three hypotheses on lattices of large dimension:

($\mathbf{H_1}$) For most lattices $\mathcal{M}$, the length $\sigma(\mathcal{M})$ of the smallest non-zero vector of $\mathcal{M}$ satisfies $$\sqrt{\frac{\dim(\mathcal{M})}{2\pi e}} \operatorname{Disc}(\mathcal{M})^{1/\dim(\mathcal{M})} \leq \sigma(\mathcal{M}) \leq \sqrt{\frac{\dim(\mathcal{M})}{\pi e}} \operatorname{Disc}(\mathcal{M})^{1/\dim(\mathcal{M})}.$$

Hence if $\mathbf{v} \in \mathcal{M}$ satisfies $$|\mathbf{v}| \geq \sqrt{\frac{\dim(\mathcal{M})}{\pi e}} \operatorname{Disc}(\mathcal{M})^{1/\dim(\mathcal{M})},$$

then $\mathbf{v}$ will be hidden in a cloud of exponentially many vectors of approximately the same length.

($\mathbf{H_2}$) Suppose that the lattice $\mathcal{M}$ has a vector $\mathbf{w}$ which is smaller than the shortest expected vector described by ($\mathbf{H_1}$), but that $\mathcal{M}$ is otherwise a "random" lattice. If $\mathbf{w}$ satisfies $$|\mathbf{w}| > \kappa^{-\dim(\mathcal{M})} \sqrt{\frac{\dim(\mathcal{M})}{\pi e}} \operatorname{Disc}(\mathcal{M})^{1/\dim(\mathcal{M})},$$

then lattice reduction is highly unlikely to find $\mathbf{w}$.

($\mathbf{H_3}$) Suppose we are in the situation of ($\mathbf{H_2}$). Then the smallest non-zero vector $\mathbf{v}_{LLL}$ computed by lattice reduction methods is almost certain to satisfy $$|\mathbf{v}_{LLL}| \geq \kappa^{\dim(\mathcal{M})} |\mathbf{w}|.$$

I-7

NTRU: A RING-BASED PUBLIC KEY CRYPTOSYSTEM

*Remark.* The *lattice reduction constant* $\kappa$ which appears in hypotheses ($H_2$) and ($H_3$) must be determined by experimentation and experience. This is similar to the situation with the RSA PKCS, where security rests on estimating current capabilities for factoring products $pq$. It is even more closely analogous to the PKCS described in [5], whose security is directly linked to the difficulty of finding small (almost orthogonalized) bases for lattices. Experiments with lattices of large ($\geq 100$) dimension suggest that one can take $\kappa = 1.5^{1/100}$. (See, for example, [11] and [12].) And just as future advances in factorization will require the use of larger primes in the RSA PKCS, so future advances in lattice reduction will undoubtedly require using a smaller value of $\kappa$ and correspondingly larger parameters in NTRU. We also mention that we will only need to assume hypotheses ($H_2$) and ($H_3$) for lattices of dimension greater than 700. For lattices of such high dimension, even the LLL algorithm with Schnorr's block reduction improvement takes quite a long time. If we are willing to assume hypotheses ($H_2$) and ($H_3$) for lattices of dimension around 300, we can choose NTRU parameters with even better operating characteristics.

§3.3.1 Small lattice attack on the key $f$. We begin with what is probably the most natural lattice, namely we take any one of the $h_i$'s and search for the small vector $f$ with the property that $h_i \circledast f \pmod{q}$ is also small. To do this, we write $h_i = [h_{i1}, \ldots, h_{iN}]$ and consider the lattice $\mathcal{M}$ generated by the columns of the following matrix:

$$M = \begin{pmatrix} \lambda & 0 & \cdots & 0 & 0 & 0 & \cdots & 0 \\ 0 & \lambda & \cdots & 0 & 0 & 0 & \cdots & 0 \\ \vdots & \vdots & \ddots & \vdots & \vdots & \vdots & \ddots & \vdots \\ 0 & 0 & \cdots & \lambda & 0 & 0 & \cdots & 0 \\ \hline h_{i1} & h_{i2} & \cdots & h_{iN} & q & 0 & \cdots & 0 \\ h_{i2} & h_{i3} & \cdots & h_{i1} & 0 & q & \cdots & 0 \\ \vdots & \vdots & \ddots & \vdots & \vdots & \vdots & \ddots & \vdots \\ h_{iN} & h_{i1} & \cdots & h_{i,N-1} & 0 & 0 & \cdots & q \end{pmatrix}$$

With an eye towards future notational convenience, we will write this matrix as $$M = \begin{pmatrix} \lambda I & 0 \\ \tilde{h}_i & qI \end{pmatrix}.$$

The quantity $\lambda$ will be chosen by the attacker to optimize the attack. We observe that $\mathcal{M}$ satisfies $$\dim(\mathcal{M}) = 2N \quad \text{and} \quad \operatorname{Disc}(\mathcal{M}) = \lambda^N q^N.$$

There are two issues to consider. First, is the actual key $f$ embedded in $\mathcal{M}$ as a short vector. Notice that $\mathcal{M}$ contains the target vector $$v_{\text{targ}} = [\lambda f_N, \ldots, \lambda f_1, g_{i1}, \ldots, g_{iN}],$$

and knowledge of $v_{\text{targ}}$ allows recovery of $f$. However, we can compute the length of $v_{\text{targ}}$ as $$|v_{\text{targ}}|_2 = \sqrt{|\lambda f|_2^2 + |g_i|_2^2} = L_g \sqrt{\lambda^2 + 1}.$$

I-8
JEFFREY HOFFSTEIN, JILL PIPHER, JOSEPH H. SILVERMAN

Hypothesis ($H_1$) says that $f$ is safe from attack if $|v_{\text{targ}}|_2$ satisfies the inequality $$|v_{\text{targ}}|_2 \geq \sqrt{\frac{\dim(\mathcal{M})}{\pi e}} \operatorname{Disc}(\mathcal{M})^{1/\dim(\mathcal{M})} = \sqrt{\frac{2N\lambda q}{\pi e}}.$$

In other words, we need $$L_g \sqrt{\lambda + \lambda^{-1}} \geq \sqrt{\frac{2Nq}{\pi e}}.$$

The optimal $\lambda$ from the attacker's viewpoint is $\lambda = 1$ (see Lemma A.1), since she wants to minimize the left-hand side. So we will be safe provided $$q \leq \frac{\pi e L_g^2}{N}. \tag{5}$$

A second consideration is whether some other small vector in $\mathcal{M}$ might allow the attacker to decode the message. Thus any small vector $[f', g'] \in \mathcal{M}$ has the property that $f'$ and $h_i \circledast f' \equiv g' \pmod{q}$ are both small. However, if the attacker computes $$e \circledast f' \equiv \sum_{j=1}^{K} p\phi_j \circledast h_j \circledast f' + m \circledast f' \pmod{q},$$

only the term with $j = i$ will have small coefficients modulo $q$. Hence an $f'$ which makes a single $h_i$ small will not act as a decoding key. This suggests that we look at all of the $h_j$'s simultaneously, which leads us to the next lattice.

§3.3.2 Big lattice attack on the key $f$. Rather than using only one of the $h_i$'s, the attacker can instead form a lattice using some subset of the $h_i$'s. Relabeling, we will assume that the attacker uses $h_1, \ldots, h_k$ for some $1 \leq k \leq K$ and forms the lattice $\mathcal{M}$ generated by the columns of the matrix $$\begin{pmatrix} \lambda I & 0 & 0 & 0 & \cdots & 0 \\ \tilde{h}_1 & qI & 0 & 0 & \cdots & 0 \\ \tilde{h}_2 & 0 & qI & 0 & \cdots & 0 \\ \tilde{h}_3 & 0 & 0 & qI & \cdots & 0 \\ \vdots & & & & \ddots & \vdots \\ \tilde{h}_k & 0 & 0 & 0 & \cdots & qI \end{pmatrix}$$

(We are using the abbreviated notation from the previous section.) This lattice satisfies $$\dim(\mathcal{M}) = (k+1)N \quad \text{and} \quad \operatorname{Disc}(\mathcal{M}) = \lambda^N q^{kN}.$$

It contains the target vector (using the obvious shorthand)

$$v_{\text{targ}} = [\lambda f, g_1, g_2, \ldots, g_k].$$

(More precisely, the coordinates of $f$ need to be reversed.) This target vector has length $$|v_{\text{targ}}|_2 = \sqrt{|\lambda f|_2^2 + |g_1|_2^2 + \cdots |g_k|_2^2} = L_g \sqrt{\lambda^2 + k}.$$

I-9

NTRU: A RING-BASED PUBLIC KEY CRYPTOSYSTEM

Hypothesis (H$_2$) says that lattice reduction will not be able to find $v_{\text{targ}}$ provided that its length satisfies $$|v_{\text{targ}}|_2 \geq \kappa^{-\dim(\mathcal{M})} \sqrt{\frac{\dim(\mathcal{M})}{\pi e}} \operatorname{Disc}(\mathcal{M})^{1/\dim(\mathcal{M})}$$

$$= \kappa^{-(k+1)N} \sqrt{\frac{(k+1)N}{\pi e}} \cdot \lambda^{1/(k+1)} q^{k/(k+1)}.$$

So we will be safe from attack if $$L_g \sqrt{\lambda^{2k/(k+1)} + k\lambda^{-2/(k+1)}} \geq \kappa^{-(k+1)N} \sqrt{\frac{(k+1)N}{\pi e}} q^{k/(k+1)}.$$

As before, the attacker will choose $\lambda$ to minimize the left-hand side. Again it turns out that $\lambda = 1$ gives the minimum (See Lemma A.1), so the actual key will be safe under Hypothesis (H$_2$) provided $$q^{k/(k+1)} \leq \kappa^{(k+1)N} L_g \sqrt{\frac{\pi e}{N}}. \qquad (6)$$

§3.3.3 Big lattice attack on a spurious key $f$. Rather than searching for the true key $f$, the attacker might try to find some other key $F$ which acts as a decoding key. In order to be a spurious key, $F$ itself and also each of the products $h_j \circledast F \pmod q$ must be small. More precisely, suppose that the attacker finds an $F$ and computes $$G_j \equiv h_j \circledast F \pmod q \quad \text{for } j = 1, 2, \ldots, K.$$

We would like to know that the width ($L^\infty$ norm) of an expression $$\phi_1 \circledast G_1 + \phi_2 \circledast G_2 + \cdots + \phi_K \circledast G_K + m \circledast F$$

is generally at least $Wq$ for some *wrapping factor $W$*. (We will discuss in Section 4 the question of how large $W$ must be for for the system to be secure.)

In order to try to find a spurious key $F$, the attacker will take the lattice $\mathcal{M}$ described in Section 3.3.2 and use lattice reduction techniques to find a small vector $v_{LLL}$. The smallest non-zero vector in $\mathcal{M}$ is the vector $v_{\text{targ}} = [\lambda f, g_1, \ldots, g_K]$, so Hypothesis (H$_3$) says that $$|v_{LLL}|_2 \geq \kappa^{(K+1)N} |v_{\text{targ}}|_2.$$

Writing $v_{LLL} = [\lambda F, G_1, G_2, \ldots, G_K]$, we find that $$\sqrt{\lambda^2 |F|_2^2 + |G_1|_2^2 + \cdots + |G_K|_2^2} \geq \kappa^{(K+1)N} L_g \sqrt{\lambda^2 + K}.$$

The vector $v_{LLL}$ obtained by lattice reduction will have components whose size is more-or-less randomly distributed. In particular, all of the lengths $|\lambda F|_2, |G_1|_2, \ldots, |G_K|_2$ will be approximately the same, so we obtain (approximately)

$$|\lambda F|_2, |G_1|_2, \ldots, |G_K|_2 \geq \kappa^{(K+1)N} L_g.$$

On the other hand, we can use this and (3) to estimate $$|\phi_1 \circledast G_1 + \phi_2 \circledast G_2 + \cdots + \phi_K \circledast G_K + m \circledast F|_\infty$$
$$\geq c_1(|\phi_1|_2 \cdot |G_1|_2 + \cdots + |\phi_K|_2 \cdot |G_K|_2 + |m|_2 \cdot |F|_2)$$
$$= c_1 L_\phi(|G_1|_2 + \cdots + |G_K|_2 + |F|_2)$$
$$\geq c_1(K+1)L_\phi L_g \kappa^{(K+1)N}.$$

So the spurious key will fail with wrapping factor $W$ provided the parameters are chosen to satisfy $$Wq \leq c_1(K+1)L_\phi L_g \kappa^{(K+1)N}. \tag{7}$$

(This may be compared with the decoding inequality (4).)

§3.3.4 Big lattice attack on an individual message. There is one other sort of lattice attack which must be considered. Rather than looking for a key which decodes every message, an attacker can construct a lattice to search for an individual message. Consider the following lattice, which is similar to the one used in Section 3.3.2. Let $\mathcal{M}$ be the lattice generated by the columns of the matrix $$\begin{pmatrix} \lambda I & 0 & 0 & 0 & \cdots & 0 & 0 \\ 0 & \lambda I & 0 & 0 & \cdots & 0 & 0 \\ 0 & 0 & \lambda I & 0 & \cdots & 0 & 0 \\ 0 & 0 & 0 & \lambda I & \cdots & 0 & 0 \\ \vdots & & & & \ddots & & \vdots \\ \vdots & & & & & \ddots & \vdots \\ p\tilde{h}_1 & p\tilde{h}_2 & p\tilde{h}_3 & & \cdots & p\tilde{h}_K & qI \end{pmatrix}$$

This lattice satisfies $$\dim(\mathcal{M}) = (K+1)N \quad \text{and} \quad \text{Disc}(\mathcal{M}) = \lambda^{KN} q^N$$

and contains (using the obvious notation) the vector $$[\lambda\phi_1, \lambda\phi_2, \ldots, \lambda\phi_K, e - m]. \tag{8}$$

It contains this vector because the encoded message $e$ was constructed according to the rule $$p\phi_1 \circledast h_1 + p\phi_2 \circledast h_2 + \cdots + p\phi_K \circledast h_K + m \equiv e \pmod{q}.$$

Clearly (8) is not likely to be a short vector, since the coefficients of $e-m \pmod{q}$ will not be small. However, the attacker knows the value of $e$, so she can search for a vector in $\mathcal{M}$ which is close to the known non-lattice vector $[0, 0, \ldots, 0, e]$. The distance from the sought for lattice vector and the known non-lattice vector is the length of the vector $$v_{\text{targ}} = [\lambda\phi_1, \lambda\phi_2, \ldots, \lambda\phi_K, -m].$$

I-11

NTRU: A RING-BASED PUBLIC KEY CRYPTOSYSTEM

This is an example of an inhomogeneous lattice problem. Inhomogeneous problems tend to be somewhat harder than homogeneous problems, but to err on the side of caution, we will assume that the attacker can solve inhomogeneous problems to the exact same degree she can solve homogeneous problems. So we need to see if the attacker can find a vector of length $$|v_{\text{targ}}|_2 = L_\phi \sqrt{K\lambda^2 + p^2}.$$

(Remember that $|m|_2 = p|\phi|_2$ for every $m \in \mathcal{L}_m$ and every $\phi \in \mathcal{L}_\phi$.) According to Hypothesis ($H_2$), the attack will fail provided that $$|v_{\text{targ}}| \geq \kappa^{-\dim(\mathcal{M})} \sqrt{\frac{\dim(\mathcal{M})}{\pi e}} \operatorname{Disc}(\mathcal{M})^{1/\dim(\mathcal{M})},$$

or in other words, if $$L_\phi \sqrt{K\lambda^{2/(K+1)} + p^2 \lambda^{-2K/(K+1)}} \geq \kappa^{-(K+1)N} \sqrt{\frac{(K+1)N}{\pi e}} q^{1/(K+1)}.$$

The attacker will minimize the left-hand side by taking $\lambda = p$ (see Lemma A.1), so the attack will fail provided $$q^{1/(K+1)} \leq \kappa^{(K+1)N} L_\phi \sqrt{\frac{\pi e}{N}} p^{1/(K+1)}. \tag{9}$$

This may be compared with (6), which it complements.

§3.3.5 Summary of lattice attack parameter constraints. In the preceding parts of this section we have described various lattice attacks and devised constraints on the parameters which prevent these attacks from succeeding. There remains the question of whether there exist any choices of parameters which satisfy all of the constraints. For the convenience of the reader, we list here all of the inequalities from this section, together with the fundamental inequality (4) which is necessary if the owner of the true key $f$ is to be able to decode messages.

$$c_2 p L_g L_\phi (K+1) < q. \tag{4}$$

$$q \leq \frac{\pi e L_g^2}{N}. \tag{5}$$

$$q^{k/(k+1)} \leq \kappa^{(k+1)N} L_g \sqrt{\frac{\pi e}{N}} \quad \text{for every } 1 \leq k \leq K. \tag{$6_k$}$$

$$Wq \leq c_1(K+1) L_\phi L_g \kappa^{(K+1)N} \tag{7}$$

$$q^{1/(K+1)} \leq \kappa^{(K+1)N} L_\phi \sqrt{\frac{\pi e}{N}} p^{1/(K+1)}. \tag{9}$$

We observe that for any fixed values $c_1, c_2, p, L_\phi > 0$ and $p, \kappa, W > 1$, there always exist solutions $N, K, L_g, q$ to these inequalities. We now make a few remarks to assist in finding solutions.

I-12

JEFFREY HOFFSTEIN, JILL PIPHER, JOSEPH H. SILVERMAN

We begin by combining these inequalities in various ways. First combining (4) and (7) gives (after some algebra)

$$(K+1)N \geq \frac{\log(c_1^{-1} c_2 p W)}{\log \kappa}. \tag{10}$$

Note we have (essentially) no freedom in choosing $c_1$, $c_2$, and $\kappa$, and that $W$ will be chosen between 5 and 10 depending on the level of security desired. This leaves the choice of $p$, which will normally be fairly small. The point here is that (10) gives a lower bound for $(K+1)N$ over which we have very little control.

Next we combine (4) and (5) to get $$L_g > \frac{c_2 p (K+1) N}{\pi e} L_\phi. \tag{11}$$

In order to have some flexibility in the choice of $q$, it is a good idea to take $L_g$ to be (say) 1.5 to 2 times larger than this prescribed lower bound.

For example, if $\mathcal{L}_\phi$ and $\mathcal{L}_g$ are as described in Section 2.2, then $L_\phi = \sqrt{2d}$ and most $g \in \mathcal{L}_g$ satisfy $|g|_2 \approx L_g = \sqrt{N(r^2-1)/12}$. So after using (11) to choose $L_g$, we can take $r = \lfloor L_g \sqrt{12/N} \rfloor$, and then most $g \in \mathcal{L}_g$ will have $L^2$ norm very close to the desired $L_g$. Further, since the code creator Dan is the only one who chooses elements from $\mathcal{L}_g$, and since these choices only need to be made once, it won't be hard for him to find the necessary $K+1$ polynomials in $\mathcal{L}_g$ with norm approximately $L_g$; and even with the length restriction, the number of such polynomials in $\mathcal{L}_g$ is astronomically larger than an attacker can check via exhaustive search, since in practice $r^N$ tends to be at least $2^{500}$.

§4 IMPLEMENTATION CONSIDERATIONS

§4.1 Security and Wrapping Factors. Recall that the wrapping factor $W$ controls how much wrapping the attacker can expect when she uses a spurious key produced by lattice reduction. If $W$ is too small, for example $W = 1.5$, then the attacker will be able to recover many (maybe even most) of the coefficients, because their values tend to cluster around the mean. More precisely, the attacker will recover (say) $0.95N$ linear equations for the $N$ unkown coefficients, and then a brute-force search finishes the attack.

Coppersmith and Shamir [3] have observed that even if $W$ is a bit larger than this, say $W = 2.5$, then the clustering allows the attacker to obtain approximately $0.67N$ linear equations for the $N$ unknowns. They then observe that if the attacker constructs two independent spurious keys and applies them, she might obtain sufficiently many independent equations to solve the system. They further note that if $W = 4$, then using several short vectors *might* allow the attack to succeed by employing some sort of error-correcting technique, but that if $W$ is as large as 10, then this sort of attack will not succeed. We refer the reader to [3] for details.

Based on these considerations, we will use a wrapping factor of $W = 10$ to construct sample operating parameters.

I-13

NTRU: A RING-BASED PUBLIC KEY CRYPTOSYSTEM

§4.2 Sample Operating Parameters. In this section we will work out two sets of usable parameters for the NTRU PKCS which are secure under the hypotheses of Section 3. These parameter sets lead to a fairly high message expansion, so we refer the reader to Section 4.3 below for a two-stage version of NTRU which reduces the message expansion to a managable 2-to-1.

We begin with three values forced on us by experimental evidence, and a fourth value chosen to ensure sufficient wrapping to foil a spurious key attack:

$$c_1 = 0.08, \quad c_2 = 0.24, \quad W = 10 \quad \kappa = 1.5^{1/100} \approx 1.0040628823.$$

The values of $c_1$ and $c_2$ have been determined by extensive numerical testing in the desired ranges; but we also have a fairly good idea how to give them a probabilistic justification. The wrapping factor $W = 10$ was discussed above in Section 4.1. Finally, the choice of the lattice reduction constant $\kappa$ has already been discussed in the remark in Section 3.3, although to guard against future improvements in lattice reduction technology, the security conscious user might instead take $\kappa = 1.3^{1/100}$, with minor changes in the other parameters.

We consider first the choice $p = 2$. The inequality (10) from Section 3.3.5 tells us that we need to take $$(K+1)N \geq 1009.79,$$

so we will let $$N = 167 \quad \text{and} \quad K = 6.$$

(It is convenient, but not necessary, to have $N$ and $(N-1)/2$ both prime.) This choice will provide sufficient leeway for choosing the remaining coefficients.

We take $\mathcal{L}_\phi$ as in Section 2.2 with $d = 20$, so $\#\mathcal{L}_\phi = 167!/20! \cdot 20! \cdot 127! \approx 2^{165.85}$, which provides sufficient security against meet-in-the-middle attacks. Further, $L_\phi = \sqrt{2d} \approx 6.325$, and substituting these choices into (11) gives $L_g > 414.07$. To provide some leeway, we take $r = 167$, which makes the expected value of $L_g$ equal to 622.98. Finally, our five fundamental inequalities from Section 3.3.5 tell us that $q$ must satisfy $$2^{13.6924} < q \leq \max\{2^{14.2766}, 2^{14.7278}, 2^{14.6238}, 2^{52.481}\}.$$

(Of course, the inequality $(6_k)$ in Section 3.3.5 is really 6 inequalities, one for each $1 \leq k \leq 6$.) Thus we can take $q = 2^{14} - 1 = 16383$. (Note that $\gcd(p, q) = 1$ is required.) To recapitulate, assuming the hypotheses of Section 3.3, the following parameters give a secure NTRU PKCS:

$$N = 167, \quad k = 6, \quad q = 16383 = 2^{14} - 1, \quad p = 2, \quad r = 167, \quad d = 20, \quad s = 3,$$

where the sets $\mathcal{L}_\phi, \mathcal{L}_g, \mathcal{L}_m$ are chosen as described in Section 2.2. For these parameters we have $$\text{Public key length} = Nk \log_2 q = 14028 \text{ bits}$$
$$\text{Private key length} = N \log_2 pr = 1400 \text{ bits}$$
$$\text{Message expansion} = \log q / \log p = 14\text{-to-}1$$

Using a similar analysis, we construct a second set of secure NTRU parameters with a larger value of $p$. These parameters seem well suited to current microprocessors, since all operations are on numbers smaller than $2^{16}$, and $q$ is a power of 2, so division by $q$ with remainder is a simple shift operation. We take $$N = 167, \quad K = 6, \quad q = 2^{16}, \quad p = 3, \quad r = 354, \quad d = 40, \quad s = 7.$$

These parameters give $\#\mathcal{L}_\phi = 167!/40! \cdot 40! \cdot 87! \approx 2^{239.3}$, and $$\text{Public key length} = NK \log_2 q = 16032 \text{ bits}$$
$$\text{Private key length} = N \log_2 pr = 1678 \text{ bits}$$
$$\text{Message expansion} = \log q / \log p = 10.1\text{-to-}1$$

§4.3 Two-Stage NTRU and Improved Message Expansion. The NTRU PKCS's for the sample parameters presented in Section 4.2 have rather large message expansions. One method to decrease this expansion is to use a larger value of $p$, but this leads to significantly larger values for $(K+1)N$, which in turn increases both key sizes and decreases computational efficiency.

Another method to decrease message expansion is to use each NTRU message as a sort of one-time-pad to encode the actual message. In this two-stage version of NTRU, the encoder Cathy chooses a random polynomial $m \in \mathcal{L}_m$, while her actual plaintext message $M$ is allowed to be any polynomial modulo $q$. To encode her message, she computes the two quantities $$e \equiv \sum_{i=1}^{K} p\phi_i \circledast h_i + m \pmod{q} \quad \text{and} \quad E \equiv m \circledast h_1 + M \pmod{q}.$$

The encoded message is the pair $(e, E)$.

The decoding process is similar to before, but with one extra step. Thus the decoder Dan follows the procedure described in Section 1.4 to compute the polynomial $m$. He then recovers the message by computing $$E - m \circledast h_1 \pmod{q}.$$

We observe that the plaintext message $M$ has length $N \log_2 q$ bits, while the encoded message $(e, E)$ has length $2N \log_2 q$ bits, so message expansion is down to 2-to-1.

We make one further remark. Cathy is using the same polynomial and modulus to encode both $m$ and $M$. We do not believe that this compromises security, but for added security she could compute $E \equiv m \circledast H + M \pmod{Q}$ for a different (public) polynomial $H$ and modulus $Q$.

§4.4 Theoretical Operating Specifications. In this section we consider the theoretical operating characteristics of the NTRU PKCS. There are four integer parameters $(N, K, p, q)$, three sets $\mathcal{L}_g, \mathcal{L}_\phi, \mathcal{L}_m$ determined respectively by integers $r, d, s$ as described in Section 2.2, three experimentally determined constants $c_1, c_2, \kappa$, and a wrapping constant $W$. To ensure security, these parameters must be chosen to

I-15

NTRU: A RING-BASED PUBLIC KEY CRYPTOSYSTEM satisfy the inequalities listed in Section 3.3.5. The following table summarizes the NTRU PKCS operating characteristics in terms of these parameters.

| Plain Text Block | $N \log_2 p$ bits |
|---|---|
| Encoded Text Block | $N \log_2 q$ bits |
| Encoding Speed* | $O(KN^2)$ operations |
| Decoding Speed | $O(N^2)$ operations |
| Message Expansion | $\log_p q$-to-1 |
| Private Key Length | $N \log_2 pr$ bits |
| Public Key Length | $KN \log_2 q$ bits |

* Precisely, $4KN^2$ additions and $KN$ divisions by $q$ with remainder

For Two-Stage NTRU as described in Section 4.4, the following items change:

| Plain Text Block | $N \log_2 q$ bits |
|---|---|
| Encoded Text Block | $2N \log_2 q$ bits |
| Message Expansion | 2-to-1 |

§4.5 Other Implementation Considerations. We briefly mention some additional factors which should be considered when implementing NTRU.

(1) It is important that $\gcd(q, p) = 1$. Although in principle NTRU will work without this requirement, in practice having $\gcd(q, p) > 1$ will decrease security. At the extreme range, if $p|q$, then (exercise) the encoded message $e$ satisfies $e \equiv m \pmod{p}$, so it is completely insecure.

(2) We want most $f$'s to have inverses modulo $p$ and modulo $q$, since otherwise it will be hard to create keys. A first necessary requirement is that $\gcd(f(1), pq) = 1$, but if this fails for some chosen $f$, the code creator can instead use, say, $f(X) + 1$ or $f(X) - 1$. Assuming $\gcd(f(1), pq) = 1$, virtually all $f$'s will have the required inverses if we take $N$ to be a prime and require that for each prime $P$ dividing $p$ and $q$, the order of $P$ in $(\mathbb{Z}/N\mathbb{Z})^*$ is large, say either $N - 1$ or $(N - 1)/2$. For example, this will certainly be true if $(N - 1)/2$ is itself prime (i.e., $N$ is a Sophie Germain prime). Examples of such primes include 107 and 167.

§5 MODERATE SECURITY PARAMETERS FOR NTRU

There are many situations in the real world where high speed and/or low memory requirements are important and a moderate level of security is acceptable. In this context, we observe that actual lattice reduction methods [11, 12] are extremely CPU intensive and that, in practice, it requires a large expenditure of computer time to perform a lattice reduction on a lattice of dimension 200 to 300. Of course, "large" here is a relative term, but it would probably not be worthwhile to perform a 300 dimensional lattice reduction to steal something worth a fraction of a cent, and it would certainly be very expensive (if not completely infeasible) using current methods to perform such a lattice reduction in a short period of time (say a few minutes). Thus it is worthwhile creating a set of NTRU parameters which can be used in situations where one is willing to allow the possibility of large dimensional lattice attacks.

If we eliminate the parameter constraints coming from lattice attacks, we are left with only the decoding constraint $$c_2 p L_g L_\phi (K+1) < q \tag{4}$$

and the condition that the search spaces for $f$, $g$, and $\phi$ are large enough to prevent a brute-force (or possibly a meet-in-the-middle) attack. For simplicity, we will take $K = 1$. We will take all of $f, g, \phi$ to be in the set $\mathcal{L}_\phi$, which is the set of polynomials with $d$ coefficients equal to 1, $d$ coefficients equal to $-1$, and the other $N - 2d$ coefficients equal to 0. (More precisely, since we need $f$ to be invertible modulo $p$ and $q$, we will take $f$ to have an extra 1 coefficient, but this will have little effect on the subsequent analysis, so we will ignore it.) Using $c_2 = 0.24$ as usual, the decoding constraint becomes simply $$q > 2pd. \tag{4}$$

Our other constraint is $$\binom{N}{d;d;N-2d} = \frac{N!}{(d!)^2(N-2d)!} \geq 2^{2\sigma},$$

where $\sigma$ is the desired security level. We note that for moderate security implementations, a security level of around $2^{40}$ will generally suffice, so we will take $\sigma \approx 40$.

The following table gives some acceptable operating parameters for a moderate security implementation of NTRU. In evaluating the security, we note that available lattice attacks use a lattice of dimension $2N$. We also note that the listed value of $q$ is the smallest allowed, but that a somewhat larger $q$ satisfying $\gcd(p,q) = 1$ is acceptable. In particular, especially fast implementations are available by taking $q = 64$.

| $N$ | $d$ | $\sigma$ | $p$ | $q$ |
|-----|-----|----------|-----|-----|
| 107 | 9 | 41.11 | 2 | 37 |
| 107 | 9 | 41.11 | 3 | 55 |
| 167 | 7 | 38.98 | 2 | 29 |
| 167 | 7 | 38.98 | 3 | 43 |
| 263 | 7 | 43.72 | 2 | 29 |
| 263 | 7 | 43.72 | 3 | 43 |

Finally, we observe that the key sizes are very small,

Public Key:  $N \log_2(q)$ bits

Private Key:  $2N \log_2(p)$ bits

For example, $(N, d, p, q) = (167, 7, 3, 64)$ gives a system with public and private keys of lengths 1002 bits and 530 bits respectively.

I-17

NTRU: A RING-BASED PUBLIC KEY CRYPTOSYSTEM

§6 COMPARISON WITH OTHER PKCS'S

There are currently a number of public key cryptosystems in the literature, including the system of Rivest, Shamir, and Adelman (RSA [10]) based on the difficulty of factoring, the system of McEliece [9] based on error correcting codes, and the recent system of Goldreich, Goldwasser, and Halevi (GGH [5]) based on the difficulty of finding short almost-orthogonalized bases in a lattice.

The NTRU system has some features in common with McEliece's system, in that ⊛-multiplication in the ring $R$ can be formulated as multiplication of matrices (of a special kind), and then encoding in both systems can be written as a matrix multiplication $E = AX + Y$, where $A$ is the public key. A minor difference between the two systems is that for an NTRU encoding, $Y$ is the message and $X$ is a random vector, while the McEliece system reverses these assignments. But the real difference is the underlying trap-door which allows decoding. For the McEliece system, the matrix $A$ is associated to an error correcting (Goppa) code, and decoding works because the random contribution is small enough to be "corrected" by the Goppa code. For NTRU, the matrix $A$ is a circulant matrix, and decoding depends on the decomposition of $A$ into a product of two matrices having a special form, together with a lifting from mod $q$ to mod $p$.

As far as we can tell, the NTRU system has little in common with the RSA system. Similarly, although the NTRU system must be set up to prevent lattice reduction attacks, its underlying decoding method is very different from the GGH system, in which decoding is based on knowledge of short lattice bases. In this aspect, GGH actually resembles the McEliece system, since in both cases decoding is performed by recognizing and eliminating a small random contribution. Contrasting this, NTRU eliminates a much larger random contribution via divisibility (i.e., congruence) considerations.

The following table compares some of the theoretical operating characteristics of the RSA, McEliece, GGH, and NTRU cryptosystems. In each case the number $N$ represents a natural security/message length parameter.

|  | NTRU | RSA | McEliece | GGH |
|---|---|---|---|---|
| Encoding Speed[1,2] | $N^2$ | $N^2$ | $N^2$ | $N^2$ |
| Decoding Speed[3] | $N^2$ | $N^3$ | $N^2$ | $N^2$ |
| Public Key | $N$ | $N$ | $N^2$ | $N^2$ |
| Private Key | $N$ | $N$ | $N^2$ | $N^2$ |
| Message Expansion[4] | 2-1 | 1-1 | 2-1 | 1-1 |

[1] NTRU encoding requires only additions and shifts, no other multiplications
[2] RSA encoding is $O(N^3)$ unless small encoding exponents are used.
[3] Asymptotically, NTRU encoding and decoding are $O(N \log N)$ using FFT.
[4] This assume Two-Stage NTRU is used.

I-18

JEFFREY HOFFSTEIN, JILL PIPHER, JOSEPH H. SILVERMAN

Appendix A. An Elementary Lemma

The following result is useful for optimizing lattice attacks.

Lemma A.1. *For all* $A, B, \alpha, \beta \geq 0$ *with* $\alpha + \beta = 1$, $$\inf_{x>0} Ax^\alpha + Bx^{-\beta} = \frac{A^\beta B^\alpha}{\alpha^\alpha \beta^\beta},$$

*with the infimum occurring at* $x = \beta B / \alpha A$.

*Proof.* Let $f(x) = Ax^\alpha + Bx^{-\beta}$. Then $f'(x) = \alpha A x^{\alpha-1} - \beta B x^{-\beta-1} = x^{\beta+1}(\alpha A x - \beta B)$. So the absolute minimum is at $x = \beta B / \alpha A$. (Note that $f(x) \to \infty$ as $x \to 0^+$ and as $x \to \infty$.)

References

1. M. Blum, S. Goldwasser, *An efficient probabilistic public-key encryption scheme which hides all partial information*, Advances in Cryptology: Proceedings of CRYPTO 84, Lecture Notes in Computer Science, vol. 196, Springer-Verlag, 1985, pp. 289–299.
2. H. Cohen, *A course in computational algebraic number theory*, Graduate Texts in Math., vol. 138, Springer Verlag, Berlin, 1993.
3. D. Coppersmith, A. Shamir, *Lattice attacks on NTRU*, Preprint, April 5, 1997; presented at Eurocrypt 97.
4. W. Diffie, M.E. Hellman, *New directions in cryptography*, IEEE Trans. on Information Theory 22 (1976), 644–654.
5. O. Goldreich, S. Goldwasser, S. Halevi, *Public-key cryptosystems from lattice reduction problems*, MIT – Laboratory for Computer Science preprint, November 1996.
6. S. Goldwasser and A. Micali, *Probabilistic encryption*, J. Computer and Systems Science 28 (1984), 270–299.
7. J. Hoffstein, J. Pipher, J.H. Silverman, *NTRU: A new high speed public key cryptosystem*, Preprint; presented at the rump session of Crypto 96.
8. A.K. Lenstra, H.W. Lenstra, L. Lovśz, *Factoring polynomials with polynomial coefficients*, Math. Annalen 261 (1982), 515–534.
9. R.J. McEliece, *A public-key cryptosystem based on algebraic coding theory*, JPL Pasadena, DSN Progress Reports 42–44 (1978), 114–116.
10. R.L. Rivest, A. Shamir, L. Adleman, *A method for obtaining digital signatures and public key cryptosystems*, Communications of the ACM 21 (1978), 120–126.
11. C.P. Schnorr, *Block reduced lattice bases and successive minima*, Combinatorics, Probability and Computing 3 (1994), 507–522.
12. C.P. Schnorr, H.H. Hoerner, *Attacking the Chor Rivest cryptosystem by improved lattice reduction*, Proc. EUROCRYPT 1995, Lecture Notes in Computer Science 921, Springer-Verlag, 1995, pp. 1–12.
13. D. Stinson, *Cryptography: Theory and Practice*, CRC Press, Boca Raton, 1995.

APPENDIX II

*Abstract.* Pseudo-code is given for the commutative polynomial implementation of the NTRU Public Key Cryptosystem.

The commutative polynomial implementation of the NTRU PKCS uses polynomials of degree $N$. For the purposes of computer implementation, it is most convenient to represent polynomials as vectors $$\mathbf{a} = [a_1, a_2, \ldots, a_N] \quad \text{corresponding to} \quad a(X) = \sum_{i=1}^{N} a_i X^{N-i}.$$

Pseudo-code will be given for the following high-level routines implementing the NTRU PKCS.

> CREATEKEY($N, K, q, p, r$)      Create an NTRU public/private key
> ENCODE($N, K, q, p, d, m, h_1, \ldots, h_K$)    Encode the message $m$
> DECODE($N, q, p, e, f$)      Decode the message $e$ We also give pseudo-code for the following low-level polynomial routines:

> STARMULTIPLY($a, b, N, M$)    Multiply $a * b$ (reduce modulo $M$ if $M > 0$)
> INVERSEPOLY($a, N, M$)    Compute the inverse of $a$ modulo $(M, X^N - 1)$ We leave for the reader to supply their own routine for performing division with remainder in the polynomial ring $(\mathbf{Z}/P\mathbf{Z})[x]$ when $P$ is prime. We will further assume that the user is able to generate cryptographically secure random bits.

CREATEKEY($N, K, q, p, r$)

[*Comments.* Create a private key $(f, F_p)$ and public key $(h_1, \ldots, h_K)$ corresponding to the integers parameters $(q, p, r, s)$.]

Choose a vector $f$ with coordinates randomly selected
        between $-r/2$ and $r/2$.
    $F_q$ = INVERSEPOLY($f, N, q$)
    $F_p$ = INVERSEPOLY($f, N, p$)
    IF EITHER INVERSION FAILS, SELECT A NEW $f$ AND REPEAT
    Choose vectors $g_1, \ldots, g_K$ with coordinates randomly
        selected between $-r/2$ and $r/2$.
    DO $i = 1$ TO $K$
        $h_i$ = STARMULTIPLY($F_q, g_i, N, q$)
    END $i$ LOOP
    RETURN Private Key $(f, F_p)$ and Public Key $(h_1, \ldots, h_K)$

---

ENCODE($N, K, q, d, m, h_1, \ldots, h_K$)

[*Comments.* Encode the message $m$ using the public key $(h_1, \ldots, h_K)$. The message $m$ should be a vector with coordinates between $-s/2$ and $s/2$ for an appropriate value of $s$.]

$e = m$
    DO $i = 1$ TO $K$
        Randomly choose a vector $\phi$ having $d$ coordinates equal to
            each of 1 and $-1$ and the rest 0.
        $e = e + p \cdot$ STARMULTIPLY($\phi, h_i$)
    END $i$ LOOP
    $e = e$ (mod $q$) with coefficients between $-q/2$ and $q/2$
    RETURN $e$

---

DECODE($N, q, p, f, F_p, e$)

[*Comments.* Use the private key $(f, F_p)$ to decode the message $e$.]

$a$ = STARMULTIPLY($f, e, N, q$)
    $m$ = STARMULTIPLY($a, F_p, N, p$)
    RETURN $m$

STARMULTIPLY(a, b, N, M)
[*Comments.* Compute $a(X) * b(X)$ modulo $X^N - 1$, and reduce modulo $M$ if $M > 0$. This implementation requires $N^2$ multiplications. If either a or b has small coeffficients (e.g., is a binary polynomial), there are faster implementations. If $N$ is large enough, it may be faster to compute the (convolution) product $a(X) * b(X)$ using fast Fourier transforms. ]

```
    DO k = 1 TO N
        c_k = 0
        j = k - 1
        DO i = 1 TO N
            IF j = 0
                j = N
            ENDIF
            c_k = c_k + a_i * b_j
            j = j - 1
        END i LOOP
        IF M > 0
            c_k = c_k  (mod M) with |c_k| ≤ M/2
        ENDIF
    END k LOOP
    RETURN c = [c_1, c_2, ..., c_N]
```

INVERSEPOLY(a, $N, M$)

[*Comments.* Compute the inverse of $a(X)$ modulo the ideal $(M, X^N - 1)$. We will assume that $M = P^r$ is a power of a prime, since that suffices for most applications. To compute the inverse of $a(X)$ modulo $(M, X^N - 1)$ for general $M$, one first factors $M$ as $M = \prod P_i^{r_i}$, next computes the inverse $a_i(X)^{-1}$ modulo $(P_i^{r_i}, X^N - 1)$, and finally combines the $a_i(X)^{-1}$'s using the Chinese remainder theorem to obtain $a(X)^{-1}$. The first part of our routine is adapted from [1, §1.3.2].]

(Compute the inverse of a modulo $P$)

$\quad$ b $= X^N - 1;\ $ d $=$ a$;\ $ u $= 1;\ $ v$_1 = 0;\ $ v$_3 =$ b;

$\quad$ WHILE v$_3 \neq 0$ $\quad\quad$ WRITE d $=$ v$_3 *$ q $+$ t$_3 \pmod{P}$ WITH deg(t$_3$) $<$ deg(v$_3$)

$\quad\quad$ (This is long division of polynomials in $(\mathbf{Z}/P\mathbf{Z})[X]$.)

$\quad\quad$ t$_1 =$ u $-$ q $*$ v$_1;\ $ u $=$ v$_1;\ $ d $=$ v$_3;\ $ v$_1 =$ t$_1;\ $ v$_3 =$ t$_3$ $\quad$ END WHILE $\quad$ IF deg(d) $> 0$ $\quad\quad$ RETURN 'Inversion Fails'

$\quad$ ENDIF $\quad$ c $= d_0^{-1}$u $\pmod{P}$ (If $r > 1$, refine to get an inverse modulo $P^r$)

$\quad$ $Q = P$ $\quad$ WHILE $Q < P^r$ $\quad\quad$ c$' = ($STARMULTIPLY$($a, c$, N, Q^2) - 1)/Q$ $\quad\quad$ c $=$ c $- Q *$ STARMULTIPLY$($c, c$', N, Q)$ $\quad\quad$ $Q = Q^2$ $\quad$ END WHILE $\quad$ RETURN c $\pmod{P^r}$ References

[1] H. Cohen, *A course in computational algebraic number theory*, Graduate Texts in Math., vol. 138, Springer Verlag, Berlin, 1993

We claim:

1. A method for encoding and decoding a digital message m, comprising the steps of:
   selecting ideals p and q of a ring R;
   generating elements f and g of the ring R, and generating element $F_q$ which is an inverse of f (mod q), and generating element $F_p$ which is an inverse of f (mod p);
   producing a public key that includes h, where h is congruent, mod q, to a product that can be derived using g and $F_q$;
   producing a private key from which f and $F_p$ can be derived;
   producing an encoded message e by encoding the message m using the public key and a random element ø; and
   producing a decoded message by decoding the encoded message e using the private key.

2. The method as defined by claim 1, wherein said ring R is a module over a ring Z.

3. The method as defined by claim 1, wherein the dimension of R over Z is N, and where N is an integer greater than 1.

4. The method as defined by claim 3, wherein the ring R is a ring of polynomials modulo a particular polynomial.

5. The method as defined by claim 1, wherein said step of generating elements further comprises generating element $G_q$ which is an inverse of g (mod q), and generating element $G_p$ which is an inverse of g (mod p).

6. The method as defined by claim 5, wherein said element $G_q$ is used in the derivation of said public key and said element $G_p$ is part of said private key.

7. The method as defined by claim 1, wherein said selecting step further includes selecting a positive integer K, and wherein said element g comprises respective $g_i$, with i=1,2, . . . ,K, and wherein said public key, h, comprises respective $h_i$, with i=1,2, . . . K.

8. The method as defined by claim 7, wherein said random element ø comprises respective $ø_i$ in the ideal p, with i=1,2, . . . ,K, and wherein said encoded message is produced as $$e \equiv \sum_{i=1}^{K} \phi_i * h_i + m \ (\text{mod } q).$$

9. The method as defined by claim 1, wherein said public and private keys each further include p and q.

10. The method as defined by claim 1, wherein said ideals p and q are generated by relatively prime integers.

11. The method as defined by claim 10, wherein the encoded message is congruent, mod q, to the sum of the message m and a product that includes ø and h.

12. The method as defined by claim 10, wherein said integers p and q are unequal and both p and q are greater than 1.

13. The method as defined by claim 1, wherein said encoded message is produced by a user at one location, transmitted from said one location to another location, and decoded by a user at said another location.

14. A method for encoding and decoding a digital message m, comprising the steps of:
   selecting integers p and q;
   generating polynomials f and g;
   determining inverses $F_q$ and $F_p$, where $F_q*f\equiv 1(\text{mod } q)$ $F_p*f\equiv 1(\text{mod } p)$;

producing a public key that includes p, q, h, where $h\equiv F_q*g(\text{mod } q)$;

producing a private key that includes f and $F_p$;
   producing an encoded message e by encoding the message m in the form of a polynomial using the public key and a random polynomial ø; and
   producing a decoded message by decoding the encoded message e using the private key.

15. The method as defined by claim 14, wherein said encoded message e is produced as $e\equiv p\phi*h+m(\text{mod } q).$ 16. The method as defined by claim 15, wherein said decoded message is produced by computing $a\equiv f*e(\text{mod } q),$ and then computing the decoded message, m', as $m'\equiv F_p*a(\text{mod } p).$ 17. The method as defined by claim 14, wherein said step of generating polynomials f and g includes selecting a positive integer K and generating K polynomials g, as $g_1$, $g_2$, . . . ,$g_K$, and wherein said public key comprises $h_1$, $h_2$, . . . ,$h_K$, where $h_i F_q*g_i(\text{mod } q), i=1,2, . . . ,K.$ 18. The method as defined by claim 17, wherein said encoded message e is produced as $e\equiv p\phi_1*h_1+p\phi_2*h_2+ . . . +p\phi_K*h_K+m(\text{mod } q)$ where $\phi_1,\phi_2, . . . ,\phi_K$ are K random polynomials.

19. The method as defined by claim 14, wherein said encoded message is produced by a user at one location, transmitted from said one location to another location, and decoded by a user at said another location.

20. The method as defined by claim 14, wherein a monic polynomial M(X) is selected and multiplication of polynomials is accomplished by first performing ordinary multiplication of polynomials and then dividing the result by M(X) and retaining only the remainder.

21. The method as defined by claim 14, wherein a non-zero integer N is selected and multiplication of polynomials is accomplished by reducing exponents modulo N.

22. The method as defined by claim 14, wherein said polynomials f, g, m and ø are constrained to have bounded coefficients.

23. The method as defined by claim 22, wherein said integer q is chosen smaller than a quantity determined by the said integer p, the degrees of the said polynomials f, g, m and ø, and the said constraints on the coefficients of the said f, g, m and ø.

24. The method as defined by claim 22, wherein said integer q is chosen larger than a quantity determined by the said integer p, the degrees of the said polynomials f, g, m and ø, and the said constraints on the coefficients of the said polynomials f, g, m and ø.

25. A method for encoding and decoding a digital message, comprising the steps of:
   selecting relatively prime integers p and q;
   selecting a non-zero integer K;
   producing K+2 matrices, f,g,$w_1$,$w_2$, . . . $w_K$ from a ring of matrices with integer coefficients, with $w_i\equiv 0$ (mod p) for i=1,2, . . . ,K, producing inverse matrices $F_p$, $F_q$, $G_p$ and $G_q$, from said ring of matrices where $fF_p \equiv I \pmod{p}$
$fF_q \equiv I \pmod{q}$
$gG_p \equiv I \pmod{p}$
$gG_q \equiv I \pmod{q}$ where I is an identity matrix;

producing a public key as a list of K matrices $(h_1, h_2, \ldots h_K)$ where $h_i \equiv F_q w_i G_q \pmod{q}$, $i=1,2,\ldots,K$;

producing a private key as the matrices $(f, g, F_p, G_p)$;

producing an encoded message e by encoding the message m using the private key and random integers $\phi_1, \phi_2, \ldots, \phi_K$ as $e \equiv \phi_1 h_1 + \phi_2 h_2 + \ldots + \phi_K h_K + m \pmod{q}$; and producing a decoded message m' by computing $a \equiv feg \pmod{q}$ and $b \equiv a \pmod{p}$ and then computing the decoded message m' as $m' \equiv F_p b G_p \pmod{p}$.

26. The method as defined by claim 25, wherein said encoded message is produced by a user at one location, transmitted from said one location to another location, and decoded by a user at said another location.

27. The method as defined by claim 25, wherein said matrices $w_1, w_2, \ldots w_K$, f, g, and m are constrained to have bounded coefficients and the integers $\phi_1, \phi_2, \ldots, \phi_K$ are constrained to be bounded.

28. The method as defined by claim 27, wherein said integer q is chosen smaller than a quantity determined by said integer p, said integer K, the degrees of said polynomials $w_1, w_2, \ldots, w_K$, f, g, and m, said constraints on the coefficients of said polynomials $w_1, w_2, \ldots w_K$, f, g, and m, and said constraints on the integers $\phi_1, \phi_2, \ldots \phi_K$.

29. The method as defined by claim 27, wherein said integer q is chosen larger than a quantity determined by said integer p, said integer K, the degrees of said polynomials $w_1, w_2, \ldots, w_K$, f, g, and m, said constraints on the coefficients of said polynomials $w_1, w_2, \ldots, w_K$, f, g, and m, and said constraints on the integers $\phi_1, \phi_2, \ldots \phi_K$.

30. A system for encoding and decoding a digital message m, comprising:

means for selecting ideals p and q;

means for generating elements f and g of a ring R, and generating element $F_q$ which is an inverse of f (mod q), and generating element $F_p$ which is an inverse of f (mod p);

means for producing a public key that includes h, where h is congruent, mod q, to a product that can be derived using g and $F_q$;

means for producing a private key from which f and $F_p$ can be derived;

means for producing an encoded message e by encoding the message m using the public key and a random element $\phi$; and means for producing a decoded message by decoding the encoded message e using the private key.

31. The system as defined by claim 30, wherein said encoded message is produced by a user at one location, transmitted from said one location to another location, and decoded by a user at said another location.

* * * * *